H. A. MARTIN.
TICKET ISSUING MACHINE.
APPLICATION FILED JUNE 15, 1916. RENEWED MAY 29, 1919.

1,314,345.

Patented Aug. 26, 1919.
15 SHEETS—SHEET 1.

Inventor
Haakon A. Martin
Carl Beust
Attorneys

H. A. MARTIN.
TICKET ISSUING MACHINE.
APPLICATION FILED JUNE 15, 1916. RENEWED MAY 29, 1919.

1,314,345.

Patented Aug. 26, 1919.
15 SHEETS—SHEET 4.

Inventor
Haakon A. Martin
Karl Benst
Attorneys

H. A. MARTIN.
TICKET ISSUING MACHINE.
APPLICATION FILED JUNE 15, 1916. RENEWED MAY 29, 1919.

1,314,345.

Patented Aug. 26, 1919.
15 SHEETS—SHEET 5.

Inventor
Haakon A. Martin
by
Carl Benst
Attorneys

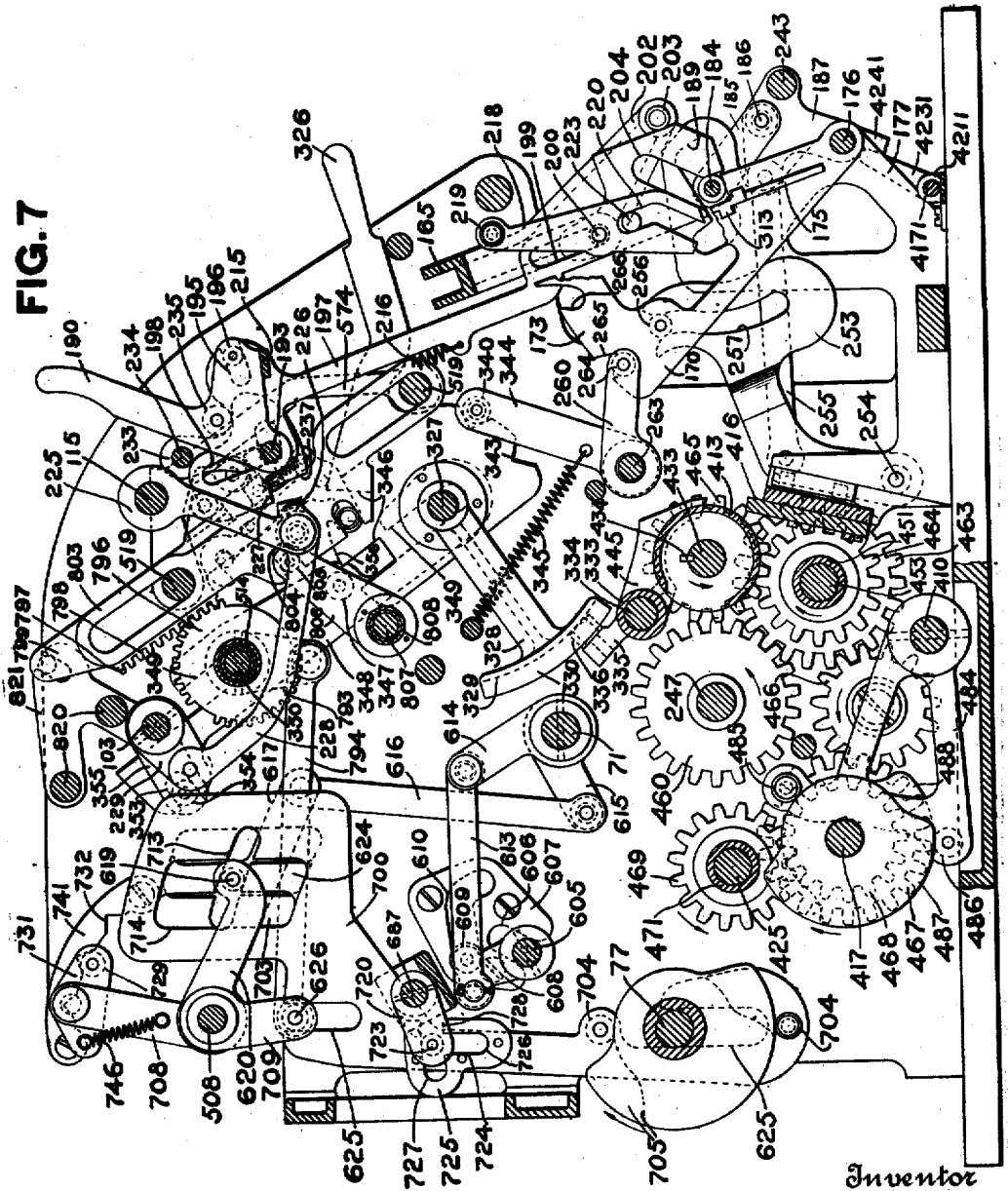

H. A. MARTIN.
TICKET ISSUING MACHINE.
APPLICATION FILED JUNE 15, 1916. RENEWED MAY 29, 1919.
1,314,345.
Patented Aug. 26, 1919.
15 SHEETS—SHEET 7.
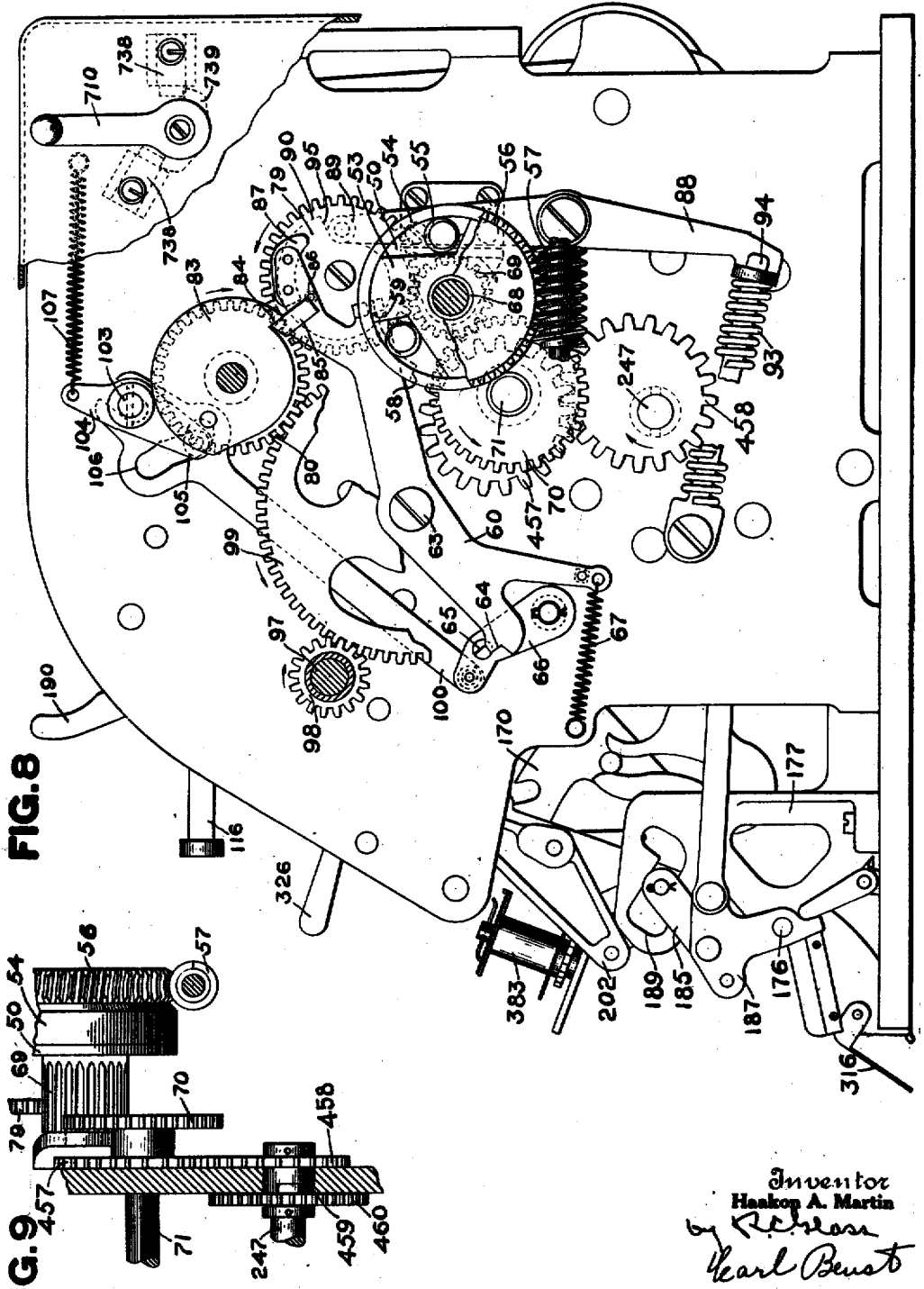
Inventor
Haakon A. Martin
by R. C. Mason
Pearl Beust
Attorney

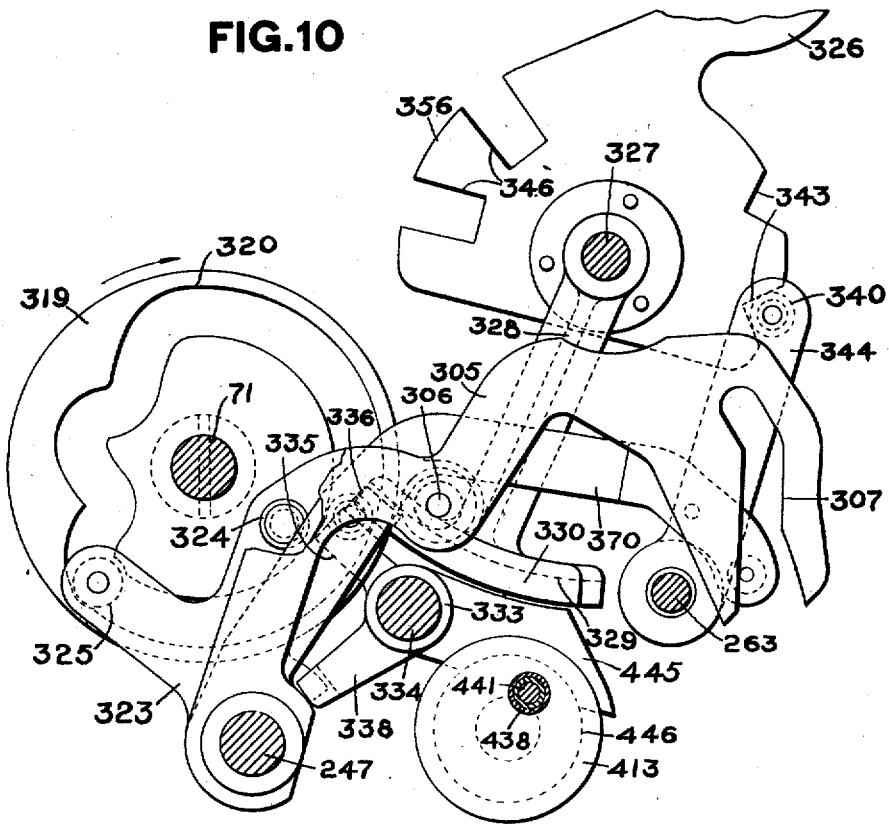

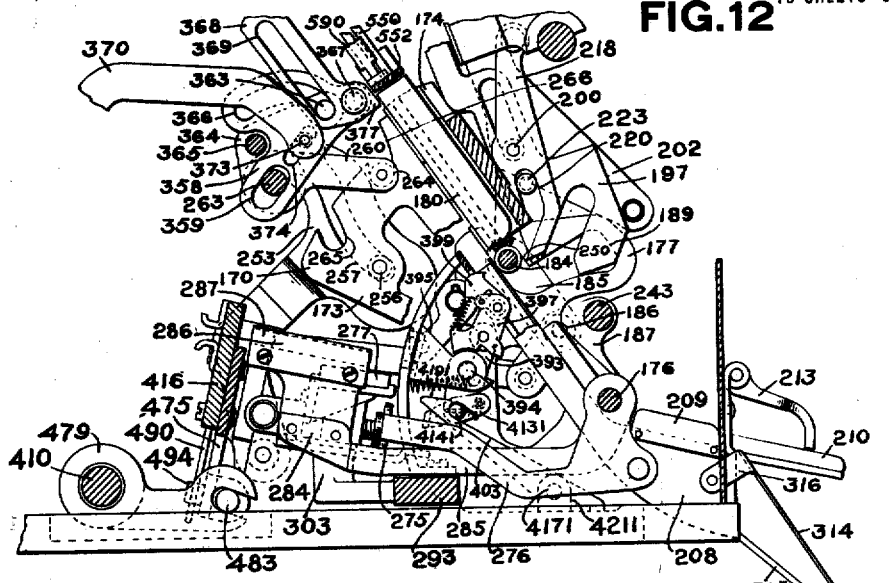
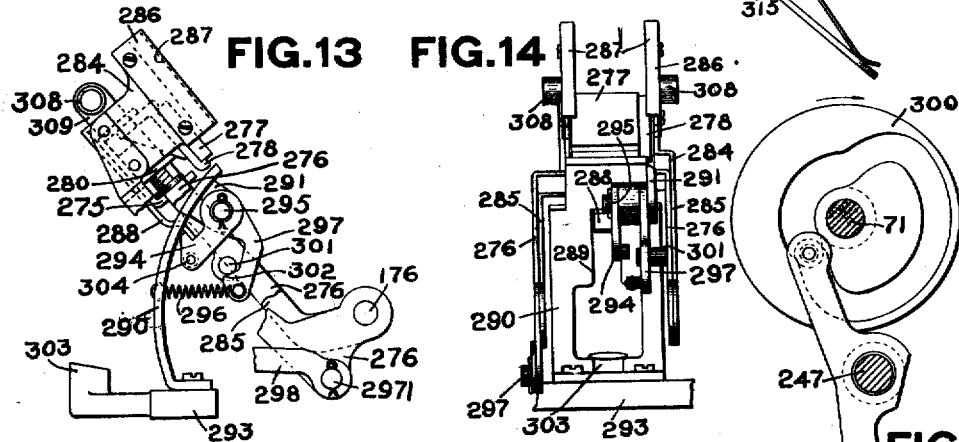
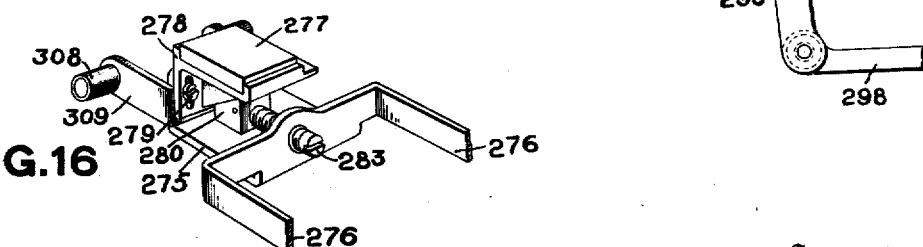

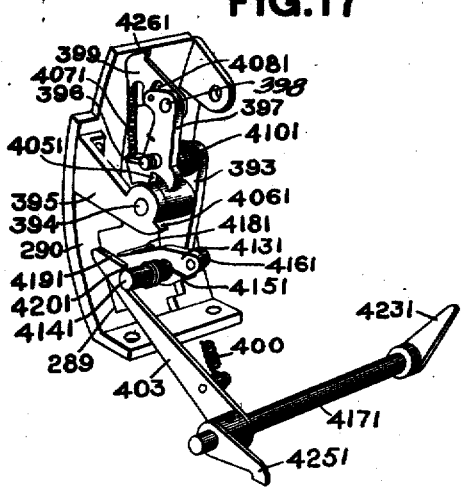
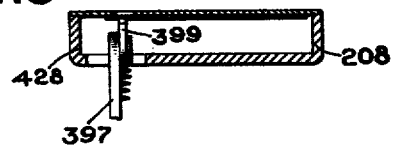
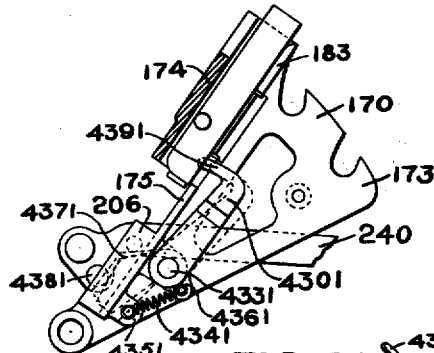
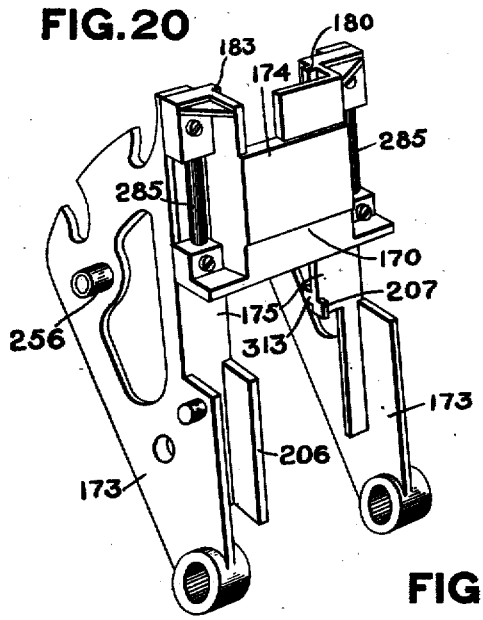
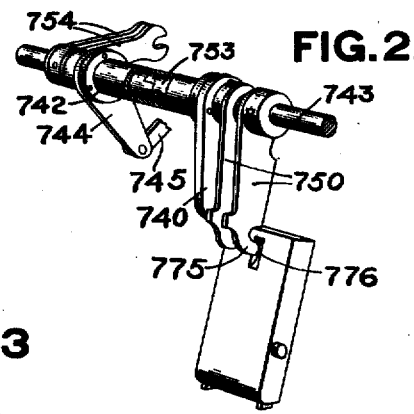
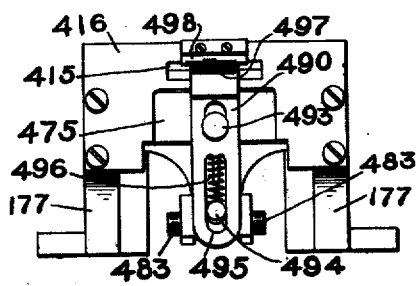

H. A. MARTIN.
TICKET ISSUING MACHINE.
APPLICATION FILED JUNE 15, 1916. RENEWED MAY 29, 1919.
1,314,345.
Patented Aug. 26, 1919.
15 SHEETS—SHEET 11.
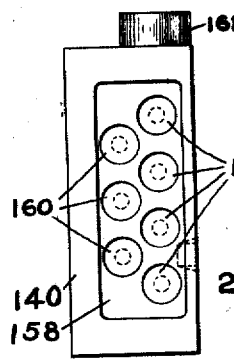
FIG.24
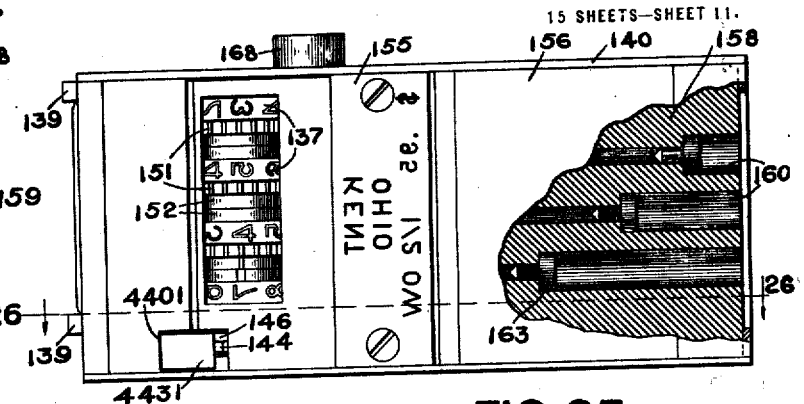
FIG.25
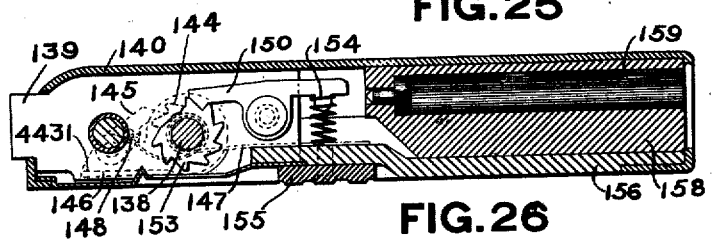
FIG.26
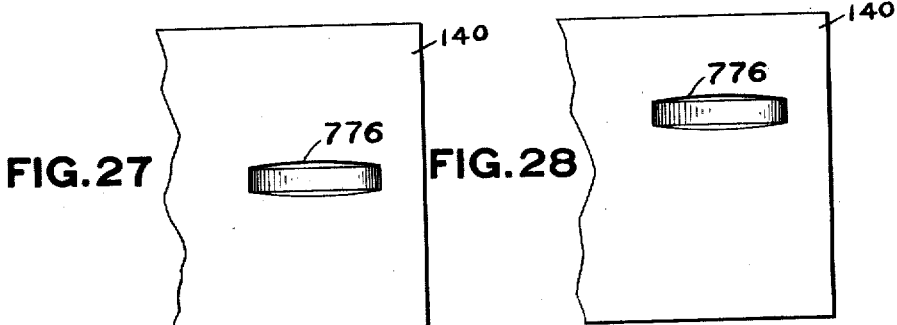
FIG.27   FIG.28
FIG.29   FIG.30   FIG.31
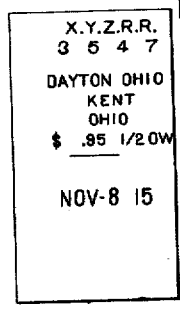
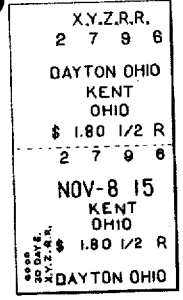
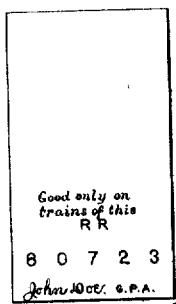
FIG.32
Inventor
Haakon A. Martin
by R. C. Glenn
Karl Benst
Attorneys H. A. MARTIN.
TICKET ISSUING MACHINE.
APPLICATION FILED JUNE 15, 1916. RENEWED MAY 29, 1919.
1,314,345.
Patented Aug. 26, 1919.
15 SHEETS—SHEET 12.
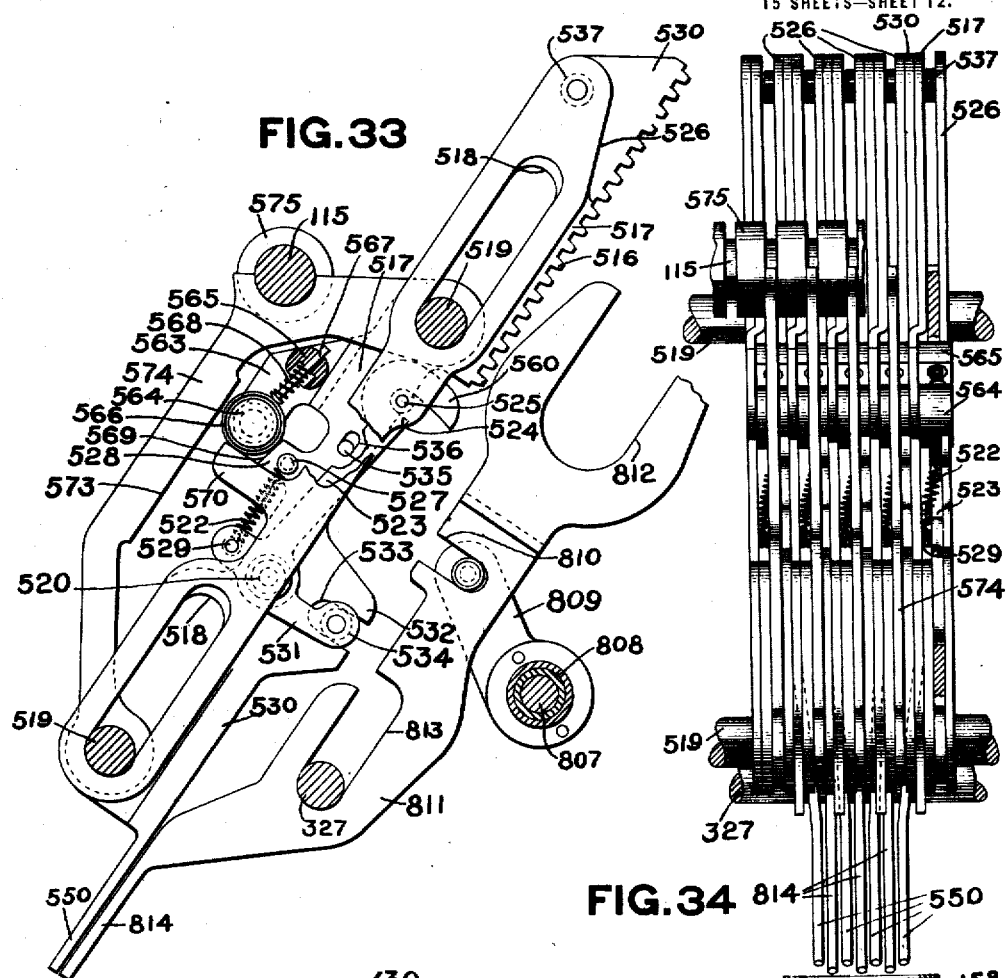
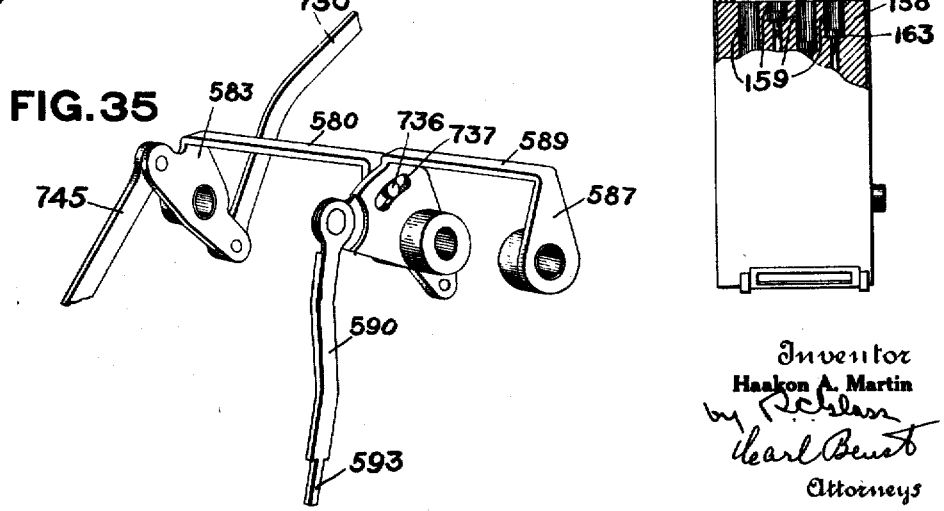
Inventor
Haakon A. Martin
by R. Chlass
Carl Beust
Attorneys

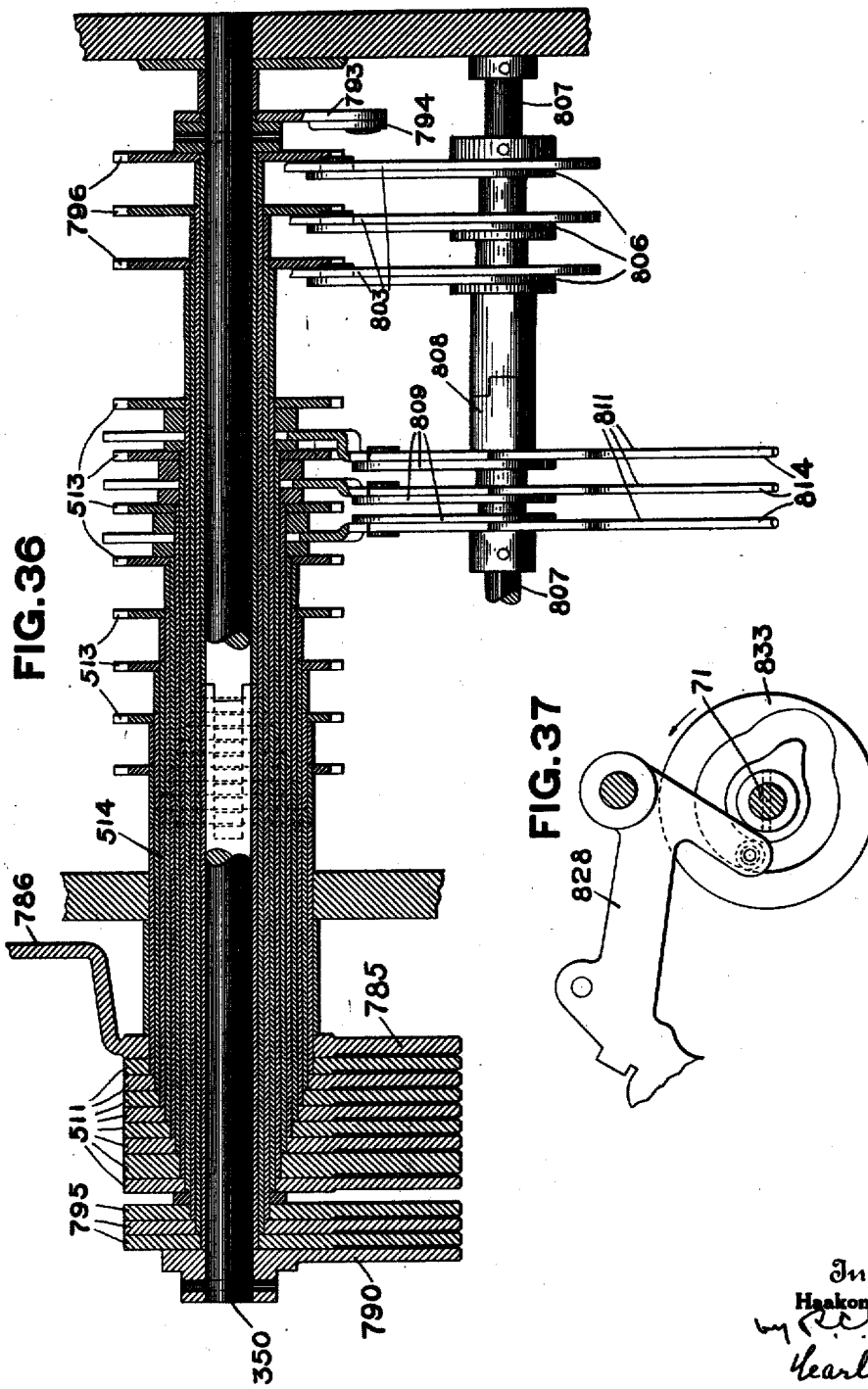

H. A. MARTIN.
TICKET ISSUING MACHINE.
APPLICATION FILED JUNE 15, 1916. RENEWED MAY 29, 1919.
1,314,345.
Patented Aug. 26, 1919
15 SHEETS—SHEET 14.
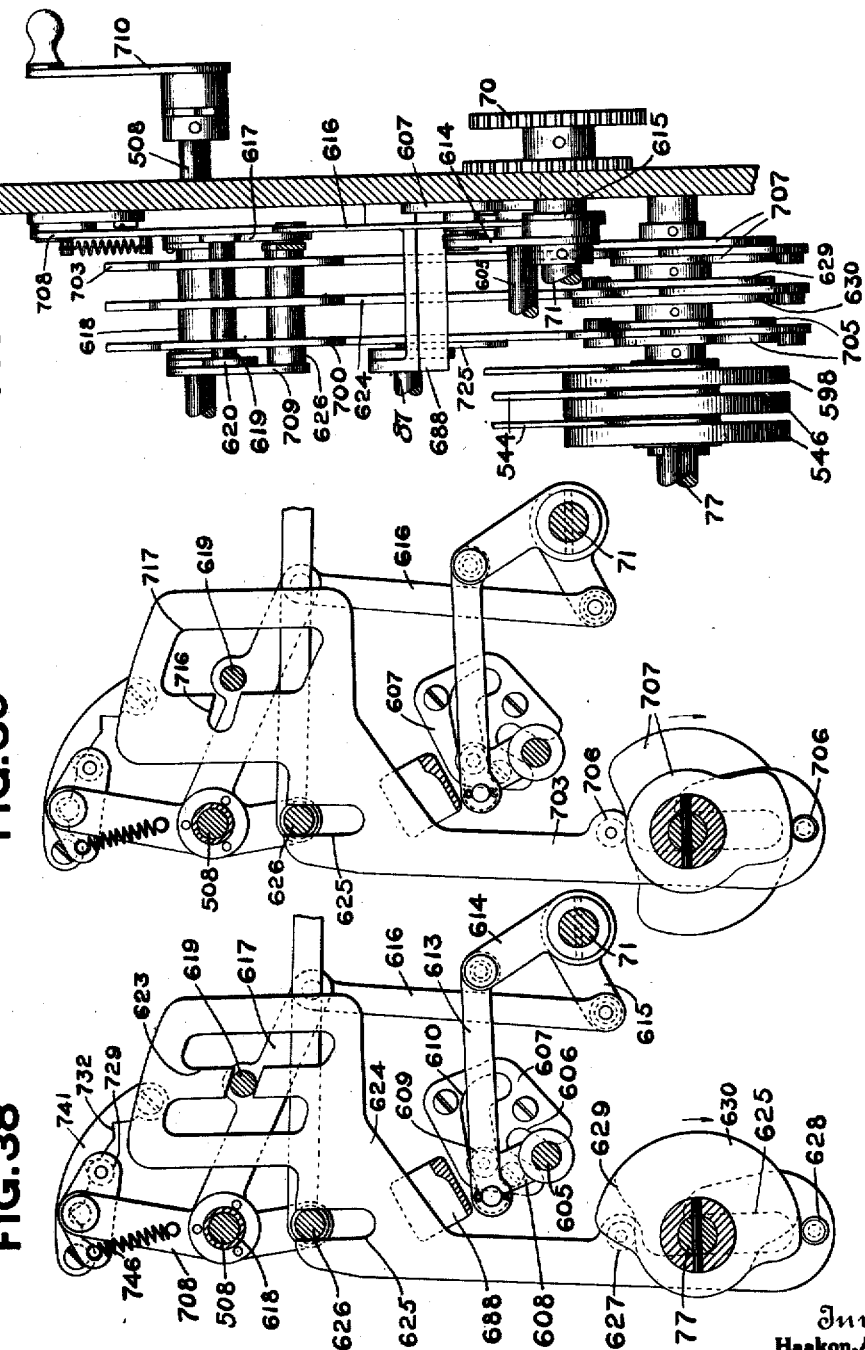
Inventor
Haakon A. Martin
by R. C. Glass
Carl Benst
Attorneys

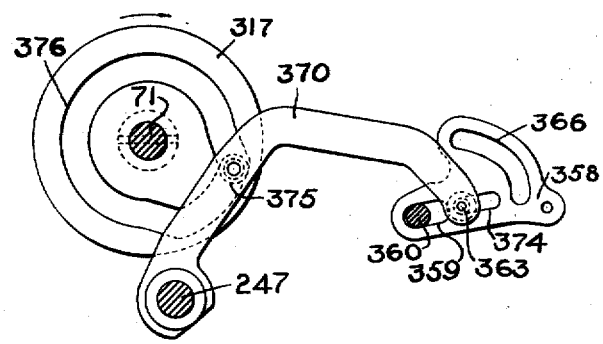
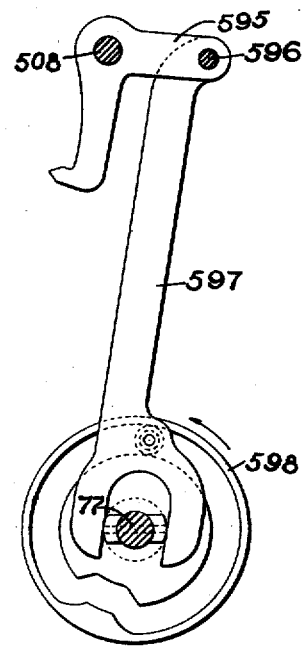
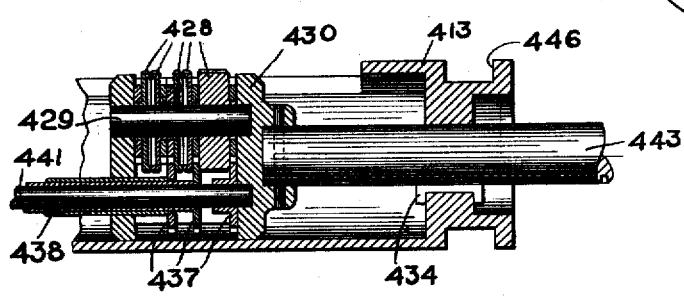
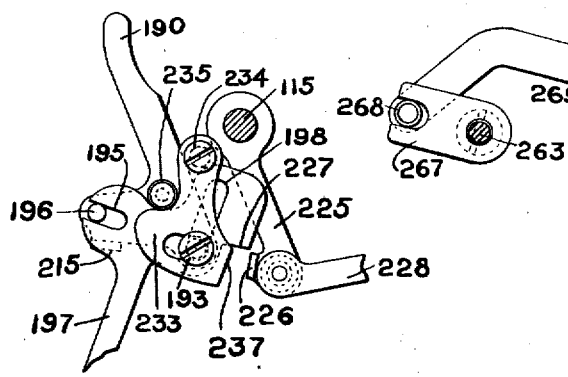

UNITED STATES PATENT OFFICE.

HAAKON A. MARTIN, OF DAYTON, OHIO, ASSIGNOR TO THE NATIONAL CASH REGISTER COMPANY, OF DAYTON, OHIO.

TICKET-ISSUING MACHINE.

1,314,345.  Specification of Letters Patent.  Patented Aug. 26, 1919.

Application filed June 15, 1916, Serial No. 103,804. Renewed May 29, 1919. Serial No. 300,774.

*To all whom it may concern:*

Be it known that I, HAAKON A. MARTIN, a citizen of the United States, residing at Dayton, in the county of Montgomery and State of Ohio, have invented certain new and useful Improvements in Ticket-Issuing Machines, of which I declare the following to be a full, clear, and exact description.

This invention relates to ticket issuing machines and has more particular relation to that class of ticket issuing machines adapted for use in issuing tickets for railroads, steamship lines or analogous uses.

The general object of the present invention is to provide an efficient and compact machine for use in railroad stations to issue tickets good only between the station at which the machine is located and other established stations. It will readily be seen that the present invention in its present embodiment is capable of other uses, such, for instance, as on steamship lines, ferry lines and other lines of local travel.

In application for U. S. Letters Patent, Serial No. 6,490, filed February 6, 1915, by Haakon A. Martin, there is shown and described a form of ticket issuing mechanism embodying detachable destination devices or matrices which control differential mechanism for actuating totalizing means and positioning type carriers adapted to print on a detail strip only the values of the tickets printed by the destination devices. In the present invention destination devices of the same general type are employed but it is one of the principal objects of the invention to construct them to perform the additional function of controlling differential mechanism which positions type carriers for printing characters or numbers on a detail strip in connection with the printed values so that the particular destination devices used are identified.

It is also one of the objects of this invention to provide novel means for preventing rebound of the differential mechanism.

It is a further object of the invention to provide means for locking the amount differential mechanism against movement during an operation in which a destination device is not used to print on the issued ticket and the machine is not prepared for printing a total or a subtotal.

It is a further object of this invention to provide means for preventing operation of the machine when the machine is prepared for issuing a ticket of one class and a destination device for printing on a ticket of another class is in the machine.

Another object of the invention is to prevent operation of the machine for printing a total or subtotal from the totalizing mechanism when a destination device is in the machine.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Figure 3:
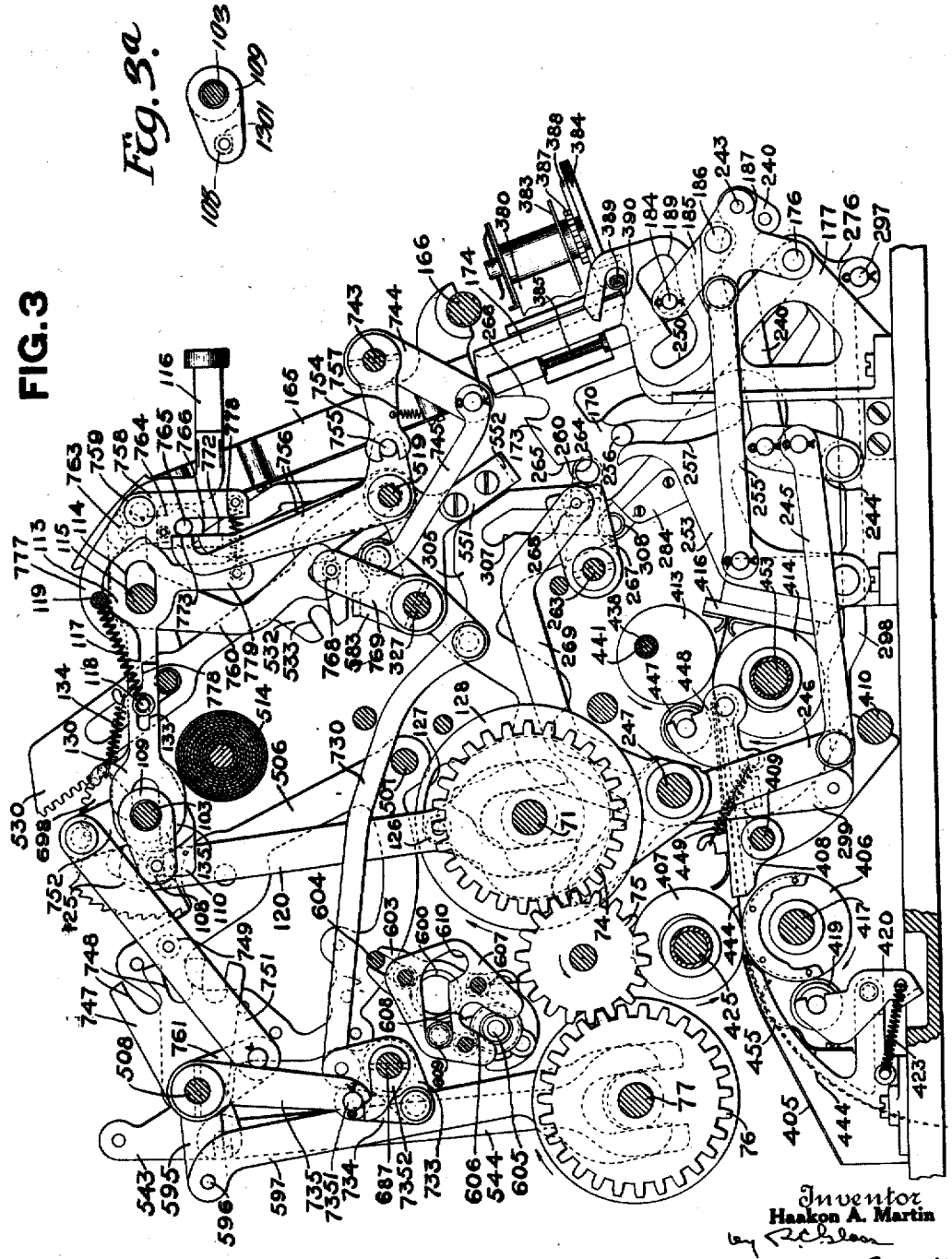
Fig. 3 is a transverse vertical section taken on the line 3—3 of Fig. 1, with various parts omitted.

Fig. 3^A is a detail of an arm and stud forming part of the mechanism for preventing repeated operation by holding the motor key depressed at the end of an operation.

Figure 1:
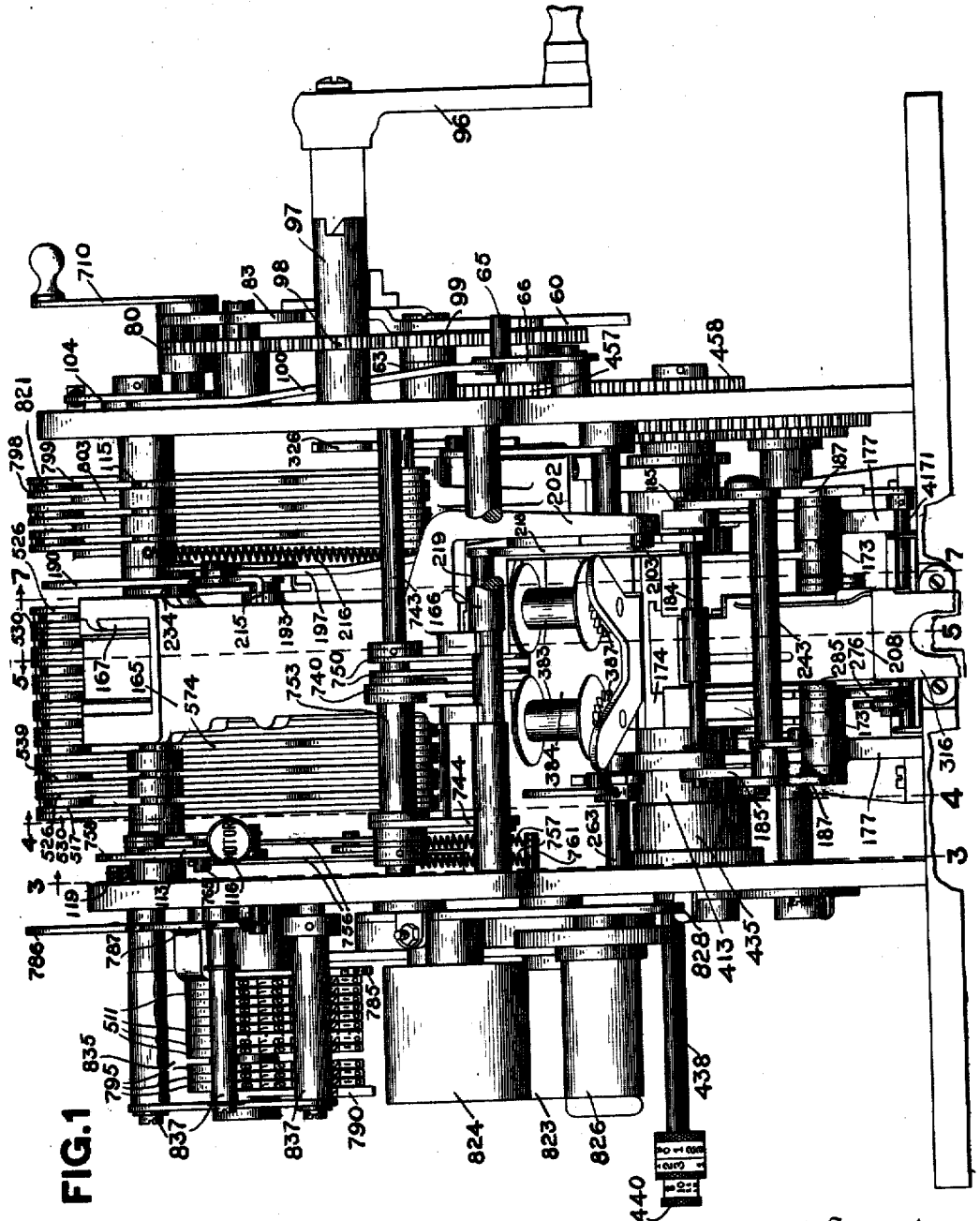
Figure 1 is a front elevation of the machine embodying the present invention, with the cabinet omitted.
Figure 4:
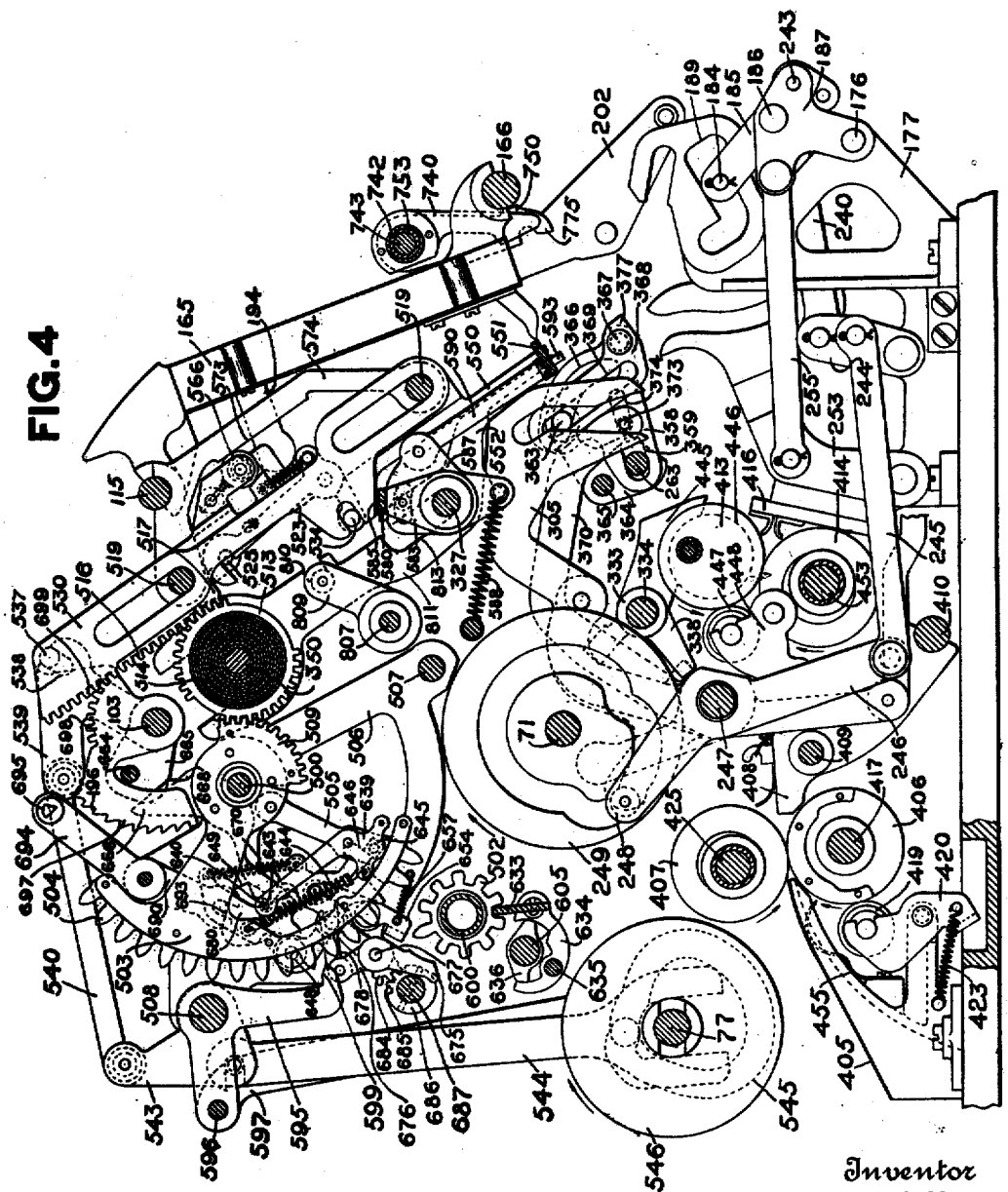

Fig. 4 is a transverse vertical section taken on the line 4—4 of Fig. 1, with various parts omitted.

Figures 5, 6:
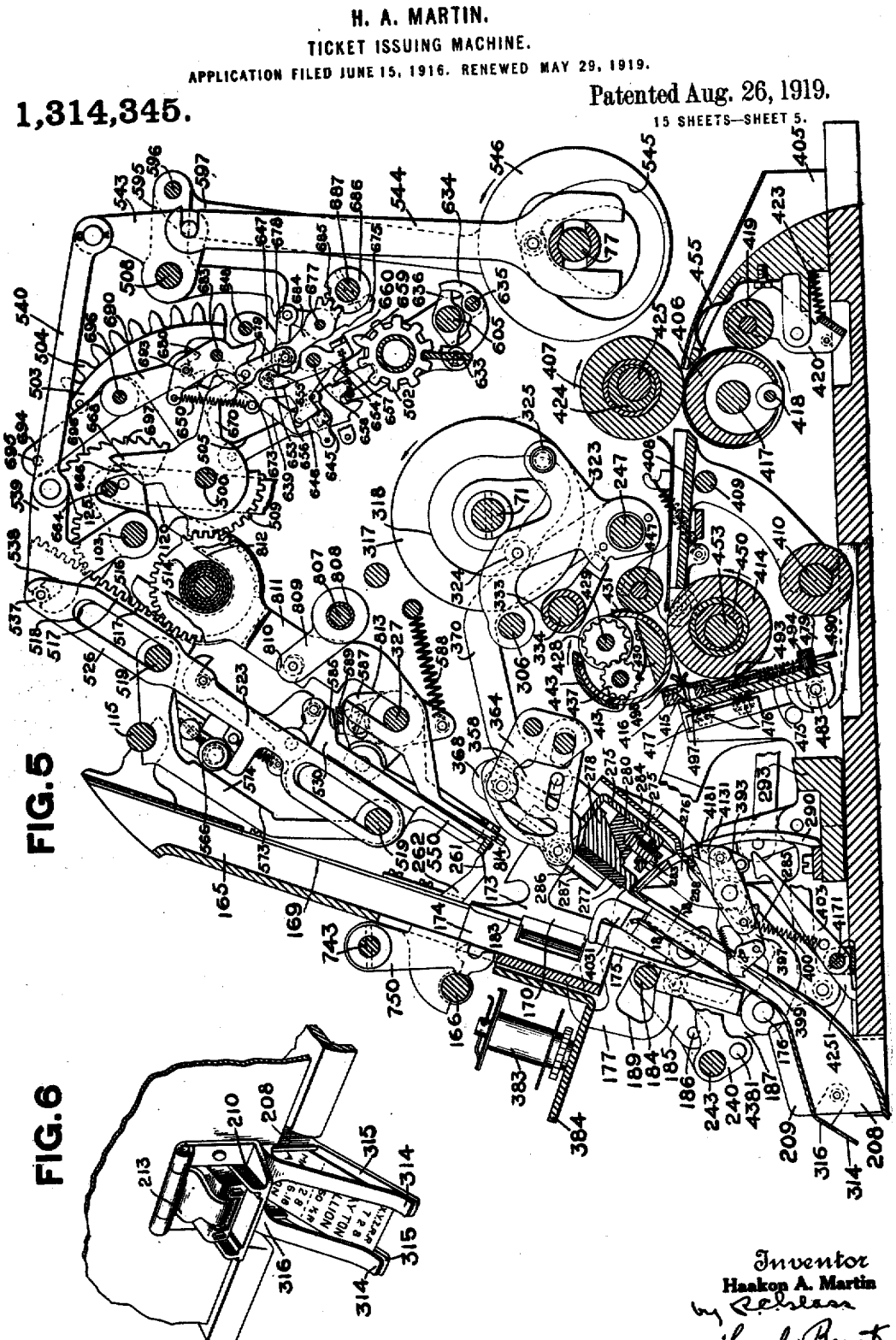

Fig. 5 is a transverse vertical section taken on the line 5—5 of Fig. 1.

Fig. 6 is a detail perspective view showing the means for retaining an issued ticket in the end of the ticket chute and the ejected destination device in position to be removed by the fingers of the operator.

Fig. 7 is a transverse vertical section taken on the line 7—7 of Fig. 1.

Fig. 8 is a right hand side elevation of the machine. In this view the motor has been omitted and the clutch connection through which the motor operates the machine is shown partly broken away.

Fig. 9 is a detail view showing part of the operating gearing of the machine.

Figs. 10 and 11 are full sized detail side and top plan views respectively of the adjustable electro-cylinder and means for adjusting it and also shows the device for operating the platen frame to make one or two impressions on a ticket, depending upon whether a one way or a round trip ticket is to be issued.

Fig. 12 is a detail sectional view through the mechanism for carrying the destination devices and effecting printing therefrom and shows the mechanism in moved position.

Fig. 13 is a detail left hand side view of the platen and ticket retaining frames.

Fig. 14 is a detail front view of the frames shown in Fig. 13.

Fig. 15 is a detail view of the cam and connections for moving the platen and ticket retaining frames into the position shown in Fig. 12.

Fig. 16 is a detail perspective view of part of the platen frame.

Fig. 17 is a detail perspective view of the ticket ejecting device and shows the device in operated position.

Fig. 18 is a detail sectional view through the ticket chute, the section being taken on the line 18—18 of Fig. 5. The ejecting pawl is shown in engagement with a ticket.

Fig. 19 is a detail sectional view through the destination device carrying frame and shows the means for operating the consecutive numbering devices of the destination devices.

Fig. 20 is a detail perspective view of the destination device carrying frame.

Fig. 21 is a detail perspective view of the means for operating the consecutive numbering devices of the destination devices.

Fig. 22 is a detail perspective view of parts of the devices for preventing operation of the machine to print a total or subtotal when the destination device is in the machine and for preventing operation of the machine when the latter is prepared for printing a ticket of one class and a destination device for printing on the ticket of another class is in the machine.

Fig. 23 is a detail rear view of the mechanism for severing tickets from the ticket strip.

Fig. 24 is an enlarged detail view of the rear end of a destination device and shows the amount and number holes.

Fig. 25 is an enlarged bottom view, partly broken away, of a destination device.

Fig. 26 is an enlarged detail sectional view taken on the line 26—26 of Fig. 25.

Figs. 27 and 28 are detail top plan views of the rear portions of two destination devices of different classes and show the grooves with which certain of the pawls shown in Fig. 22 coöperate.

Figs. 29, 30 and 31 are full sized views of tickets issued by the machine; Fig. 29 being a front view of a one way ticket; Fig. 30 a front view of a round trip ticket and Fig. 31 a rear view of a one way ticket.

Fig. 32 is an enlarged front view of one of the destination devices.

Fig. 33 is a full sized detail side view of the amount differential mechanism controlled by the destination devices.

Fig. 34 is a full sized front view of the mechanism shown in Fig. 33 and shows a destination device, partly broken away.

Fig. 35 is a full sized detail perspective view of the means for preventing movement of the amount differential mechanism during certain operations of the machine.

Fig. 36 is a full sized detail sectional view taken through a series of nested sleeves and the type carriers carried thereby.

Fig. 37 is a detail side view of part of the detail strip carrying frame and the cam for operating the same.

Fig. 38 is a full sized detail side view of the means for moving the totalizer into engagement with the actuating mechanism during adding operations in which tickets are printed upon by the destination devices.

Fig. 39 is a full sized detail side view showing the means for moving the totalizer into engagement with the actuating mechanism during subtotal printing operations.

Fig. 40 is a full sized detail view in front elevation of the means for engaging the totalizer with the actuating mechanism during adding, total printing and subtotal printing operations of the machine.

Fig. 41 is a detail side view of the means for operating the arm which moves the tickets into the position in which the round trip destination devices print on the return portions of the tickets.

Fig. 42 is a detail view of the means for alining the actuating mechanism for the totalizer.

Fig. 43 is a detail sectional view through the adjustable electro cylinder and the dating device mounted within the same.

Fig. 44 is a detail side view of the hand lever and part of the connections for controlling movement of the destination devices into and out of the machine.

Fig. 45 is a detail side view of the means for operating the arms employed to aline the destination device carrying frame in its different positions.

The printing of the name of the destination stations as well as the consecutive numbers of the tickets of each class to each destination is performed by destination devices which are in the form of detachable matrices separately insertible into the machine, one of these devices of each class being provided for each station taken care of by the machine. When a ticket is to be issued the destination device for printing on the ticket of the desired class for the desired station of destination is inserted into a chute. Upon operation of a hand lever the inserted destination device moves into a rock frame employed to carry the device into the position in which it prints upon the ticket to be issued. During operation of the machine a ticket is partly printed by an electro-cylinder and printing roll, fed over a platen in a platen carrying frame and then severed from the ticket strip. The platen frame subsequently is rocked to carry the ticket into engagement with the destination device to print therefrom. The electro-cylinder is constructed to be adjusted preliminarily to the operation of the machine so that it may print part of a "one way" or "round trip" ticket. The platen in accordance with the position of the electro-cylinder then carries the ticket once or twice against the inserted destination device to print from the latter; once if upon a "one way" ticket and twice if upon a "round trip" ticket.

While a destination device is in position to print on a ticket it is in coöperative relationship with finger bearing bars comprising part of the differential mechanism of the machine. The amount differential mechanism controlled by the destination device is employed to actuate a totalizer and position amount type carriers for printing on a detail strip. Differential mechanism also controlled by the destination devices position "number" type carriers for printing numbers in connection with the printed amounts to designate the destination device employed, a number being assigned to each destination device. The destination devices are provided with amount determining and number determining means which in the present instance are in the form of holes of different depths corresponding to the value of the tickets issued and the number of the destination devices. Upon operation of the machine the fingers on the bars of the amount and number differential mechanisms move into these holes and upon being arrested by the engagement of the fingers with the bottoms of the holes effect disconnections between the differentially movable members and their driving devices.

A pawl is operated during movement of the destination device carrying frame to actuate the consecutive numbering device of the destination device used.

*Operating mechanism.*

The form of clutch and motor connections, shown in Figs. 8 and 9, has become well known in the art and is fully shown and described in Letters Patent of the U. S. No. 1,144,418, granted to Chas. F. Kettering and Wm. A Chryst, June 29, 1915, and therefore will not be described in detail here. In general the clutch comprises a disk 50 which is adapted to be given a slight preliminary movement under the action of a spring (not shown) to couple two clutch members 53 and 54 together by means of rollers 55. The clutch member 54 is fast to a gear 56 meshing with a worm gear 57, driven positively by the motor (not shown). The disk 50 is normally restrained from such preliminary movement by engagement of a flange 58 on the disk 50 with a projection 59 on a lever 60, which is pivoted on a stud 63, projecting from the right hand side frame of the machine. A nose 64 on the lever 60 normally engages a pin 65 on an arm 66. When the pin 65 is moved out of engagement with the nose 64, as will be described presently, a spring 67 rocks the lever 60 to move the projection 59 out of engagement with the flange 58 whereupon the disk 50 is given a slight movement, as above stated, to couple the clutch members 53 and 54 together.

The clutch member 53 is fast on a sleeve 68 (Fig. 8) carrying a gear 69 meshing with a gear 70, fast on a shaft 71 journaled in the side frames of the machine. Fast on the shaft 71 is a gear 74 (Fig. 3) meshing with an intermediate gear 75 which in turn meshes with a gear 76 fast on a shaft 77 journaled in the side frames of the machine. Through this gearing the shafts 71 and 77 are given one complete rotation in the direction of the arrows (Fig. 3) upon each operation of the machine. The gear 69 (Fig. 8) also meshes with a gear 79 which in turn meshes with a gear 80 which through the gear 79 is given one complete rotation in the direction of the arrow, upon each operation of the machine. Fastened to the gear 80 is a disk 83 having a shoulder 84 normally engaging a lug 85 which is mounted on the lever 60 and therefore moved out of engagement with the shoulder 84 to permit operation of the machine when the projection 59 is moved out of engagement with the flange 58. Near the end of the operation of the machine a pin 86 on the gear 79 engages a block 87 on the lever 60 to rock the latter to normal position whereupon the arm 66 is rocked to move the pin 65 into normal engagement with the nose 64 as will be described presently.

A lever 88 (Fig. 8) carries a roller 89 engaging a disk 90 fast to the gear 79. A compressed spring 93 coiled about a pin 94, projecting through a lug on the lever 88 rocks the latter counter clockwise (Fig. 8) to normal position near the very end of the operation of the machine when the nearly radial edge 95 of the disk 90 is moved opposite the roller 89 so that movement of the roller on this edge insures movement of the operating gearing to normal position during the last few degrees of movement, as is well understood in the art.

If desired a crank handle 96 (Fig. 1) may be employed instead of the electric motor to operate the machine. The crank handle is constructed to rotate a sleeve 97 (Figs. 1 and 8) carrying a pinion 98 meshing with a gear 99, which in turn meshes with the gear 80. Through the pinion 98, gear 99 and the above described gearing, the shafts 71 and 77 are given one complete rotation by two complete rotations of the handle 96.

The mechanism for rocking the arm 66 (Fig. 8) out of normal position to effect the release of the machine will now be described. The arm 66 is pivotally connected to one end of a pitman 100 which at its other end is forked over a shaft 103. A lever 104 fast on the shaft 103 carries a roller 105 projecting into a cam slot 106 formed in the pitman 100. A spring 107 tends to rock the lever 104 and shaft 103 clockwise (Fig. 8) but such movement is normally prevented by engagement of a pin 108 (Figs. 3 and 3^A) on an arm 109 fast on the shaft 103 with a lug or block 110 mounted on the rear end of a slide 113. The slide 113 is provided with slots 114 through which the shaft 103 and a cross rod 115 project.

Mounted on the forward end of the slide 113 is a motor key 116 (Figs. 1 and 3) which when the machine is to be released, the operator pushes rearwardly thereby sliding the slide 113 rearwardly on the shaft 103 and cross rod 115 against the action of a spring 117 which is interposed between a pin 118 on the slide 113 and a stud 119 on the frame of the machine. Such rearward movement of the slide 113 moves the lug 110 from under the pin 108 whereupon the spring 107 (Fig. 8) rocks the lever 104 and shaft 103 clockwise. The cam slot 106 in the pitman 100 is so constructed that such movement of the lever 104 moves the pitman 100 downwardly thereby rocking the arm 66 to move the pin 65 out of engagement with the nose 64 of the lever 60 to permit the release of the machine. When the shaft 103 is rocked in this manner the pin 108 (Fig. 3) is lowered in front of the lug 110 thereby retaining the slide 113 and the motor key in operated position.

Near the end of the operation of the machine and after the lever 60 has been rocked back to normal locking position as above described the shaft 103 is rocked counter clockwise (Fig. 8) to normal position, as will now be described, whereupon the roller 105 through its coöperation with the slot 106 raises the pitman 100 to move the pin 65 over the nose 64 and thereby lock the lever 60 in normal position, it being remembered that the lever is restored to normal by the pin 86 engaging the block 87 on the lever 60 as hereinbefore described. A pitman 120 (Figs. 3 and 5) is pivoted to an arm 125, fast on the shaft 103. The lower end of the pitman is forked over the shaft 71 and carries a roller 126 which projects into a cam groove 127 formed in the face of a disk 128, fast on the shaft 71. This cam groove 127 is so constructed that the pitman may be lowered when the machine is released. Near the beginning of the operation of the machine the cam groove through the pitman 120 and arm 125 rocks the shaft 103 still further counter clockwise (Fig. 3) and then clockwise to the position to which it was moved by the spring 107 upon release of the machine, for a purpose to be described later. Near the end of the operation of the machine the cam groove rocks the shaft 103 counter clockwise (Fig. 8) past normal position after the lever 60 has been restored to normal. Then the spring 107 rocks the shaft 103 to normal position. When the shaft 103 is rocked counter clockwise (Fig. 8) past normal position by the cam groove 127 movement of the roller in the slot 106 moves the pitman 100 and arm 66 to normal position.

A slide 130 (Fig. 3) is provided to prevent a second immediate operation of the machine by retaining the motor key 116 and slide 113 in their rear position at the end of an operation. The slide 130 at its rear end is forked over the shaft 103 and near its forward end is provided with a slot 133 through which the pin 118 projects. A spring 134 interposed between projections on the slides 113 and 130 normally retains the forward end of the slot 133 in engagement with the pin 118. When the slide 113 is moved rearwardly to release the machine the rear end of the lower fork 135 of the slide 130 engages the forward flat side 1301 (Fig. 3^A) of the pin 108, thereby arresting the movement of the slide 130 during the continued movement of the slide 113 to its rearward position. When the shaft 103 is rocked to release the machine the pin 108 moves down between the lug 110 and the lower fork 135 of the slide 130. It can be seen from this construction that if the slide 113 and motor key are retained in their rear position until near the end of an operation of the machine the spring 134 moves the slide 130 rearwardly when the pin 108 is raised above normal position and out of engagement with the lower fork 135 so that this fork will move under the pin 108 thereby preventing the shaft 103 from rocking to release the machine. When the operator removes his finger from the motor key the spring 117 moves the slide 113 and the motor key forwardly to normal position and during this movement the pin 118 engages the forward end of the slot 133 to move the slide 130 forward to normal position so that the lower fork of the slide is carried from under the pin 108. Then when the spring 107 (Fig. 8) rocks the shaft 103 and arm 109 counter clockwise (Fig. 3) the pin 108 engages the lug 110 thereby preventing release of the machine until the motor key is again pushed to its rear position.

*Destination devices.*

A large number of destination devices are used, as one device is provided for each class of tickets issued to each of the stations taken care of by the machine. Any one of the usual classes of tickets may be represented by a destination device, such for example as "one-half fare," "full fare," "round trip," "one way" or "excursion," etc.

Each destination device (Fig. 25) is provided with a consecutive numbering device comprising a plurality of printing wheels 137 mounted on a shaft 138 (Fig. 26) which is supported in parallel plates 139. The plates are mounted in the forward end of a casing 140 of the destination device and their forward ends project through openings cut in the front end of the casing.

The units printing wheel 137 of the consecutive numbering device is fast on the shaft 138 and the remaining wheels are loose thereon. A ratchet 144 is also fast on this shaft. A pawl 145, pivoted on an arm 146 loose on the shaft 138, engages the ratchet 144. The forward end of a spring 147 coiled about the shaft 138 projects through a hole 148 in the pawl 145 and serves to retain the pawl and arm 146 in the normal position shown in Fig. 26. When the destination device is inserted into the machine and the machine operated the arm 146 is rocked clockwise (Fig. 26) in a manner to be described later, whereupon the pawl 145 rotates the ratchet 144, the shaft 138 and the units printing wheel one step to add one on the numbering device. The nose of a pawl 150 pivoted on one of the plates 139 is held in engagement with a ratchet wheel 153, fast on the shaft 138, by a spring 154 to prevent backward movement of the consecutive numbering device.

Transfer from one printing wheel to the printing wheel of next higher order may be accomplished by many well known forms of transfer mechanism, but in the present embodiment the well known "Geneva" transfer mechanism has been used, only part of which is shown in the present drawings. This type of mechanism, which in the present invention, includes pinions 151 and disks 152 (Fig. 25) need not be described in detail here as it is well known and is also fully shown and described in the above mentioned copending application and reference may be had thereto for a complete description of the same.

In addition to printing the consecutive number of the ticket issued by a destination device the latter is adapted to print the name of the destination station to which it is assigned, the fare and the class (Figs. 29 and 30). This data or any other desired data is printed by a printing plate 155, fast on a plate 156 forming part of the bottom of the casing for the destination device.

A pocket is formed in the front end of the destination device and the card 157 (Fig. 32) bearing the name of the destination station, etc., is inserted into this pocket.

A block 158 (Figs. 24, 25 and 26) is mounted in the rear end of each destination device and is provided with a row of holes 159 for controlling the amount differential mechanism of the machine and a row of holes 160 for controlling the differential mechanism which positions type carriers adapted to print the number assigned to the destination device. The means controlled by these holes will be described in detail later. Stops 163 are inserted into the holes 159 and 160 and form the bottom or ends thereof.

*Means controlling insertion and ejection of destination devices.*

When a destination device is to be used to print on a ticket it is inserted through a hole in the cabinet of the machine into the open upper end of a chute 165 (Figs. 1, 3, 4 and 5). The chute 165 is mounted on the cross rod 115 and a cross rod 166. The destination devices are inserted into the chute 165 with their card bearing ends first and the printing plates 155 facing the back of the chute. On the inner face of its right hand side the chute is provided with a rib or guide 167 (Fig. 1) on which studs 168 (Figs. 24 and 25) on the destination devices are adapted to slide, the purpose of the rib 167 and studs 168 being to prevent the insertion of the destination devices incorrectly. The back of the chute is provided with an opening 169 (Fig. 5) and the left hand side of the bottom of the destination devices are adapted to slide on the back of the chute to the left of this opening.

Figure 2:
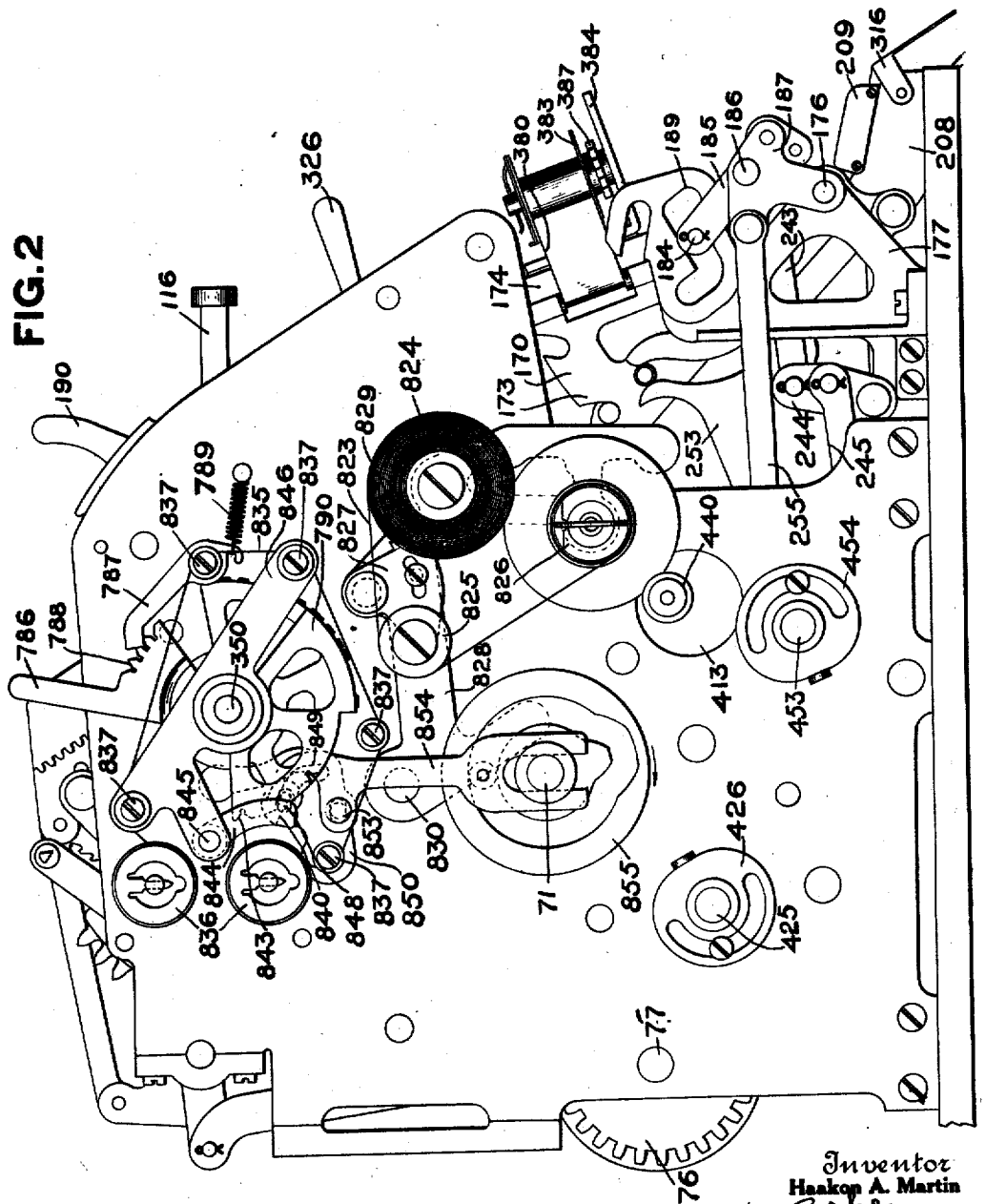
Fig. 2 is a left side elevation of the machine.

The inserted destination device drops through the chute 165 into a frame 170 (Figs. 5, 12, 19 and 20). This frame 170 consists of two side plates 173 and a member 174 fast on inwardly turned flanges 175 of the side plates. The side plates 173 are loose on rods 176 (Figs. 2 and 7) carried in corresponding frames 177 fast on the base of the machine. On the inner right hand side of the member 174 (Figs. 12 and 20) is a rib 180 upon which the studs 168 of the destination devices slide. On the inner left hand side of the member 174 is a rib 183 (Figs. 5, 19 and 20) upon which the left hand portions of the bottoms of the destination devices slide. The frame 170 is normally in such position that the inserted destination devices can slide down the chute 165 into the member 174. A cross rod 184 (Figs. 1, 2, 3, 4, 5, 7 and 12) is supported by links 185 pivoted at 186 on arms 187 which in turn are pivoted on the rods 176. The rod 184 is normally below the lower open end of the member 174 as shown in Fig. 5 so that when a destination device drops into the member 174 it is arrested by engagement of the forward ends of the plates 139 (Figs. 25 and 26) of the destination device with the rod 184. The rod 184 is adapted to be moved forward in slots 189 formed in the frames 177 to move it from under member 174 and thus release the destination device from the member 174 when the machine is not being operated. The rod 184 is moved rearward in the slots 189 during operation of the machine for a purpose and by means to be described later.

For the purpose of permitting but one destination device to be inserted completely into the machine at a time and for moving the rod 184 forwardly in slots 189 to permit the previously inserted destination device to be removed from the machine the following described mechanism is provided.

A hand lever 190 (Figs. 1, 7 and 44) is pivoted on a stud 193 projecting from an arm 194 (Fig. 4) on the chute 165. The lever 190 carries a pin 196 (Figs. 7 and 44) projecting into a slot 195 formed in a bar 197. The upper end of the bar 197 is also provided with a slot 198 through which the stud 193 projects and the bar near its lower end is provided with a slot 199 (Fig. 7) through which projects a stud 200 mounted on an arm 202 of the chute 165. It can be seen from this construction that when the lever 190 is manually rocked clockwise (Fig. 7) the pin 196 through its coöperation in the slot 195 slides the bar 197 downward on the studs 193 and 200. A roller 203 on the arm 202 engages the lower forward edge of the bar 197 to assist in guiding the latter. An inclined slot 204 is formed in the lower end of the bar 197 so that when the bar 197 is lowered by the lever 190 the slot 204 will pass over the bar 184 and force the latter forwardly in the slots 189, the arms 185 thereby being rocked about their pivots 186. When the rod 184 is moved forwardly it is moved from under the inserted destination device, that is forwardly out of the normal position in which it is shown in Figs. 5 and 7. When the rod 184 is moved in this manner the destination device falls out of the member 174, between guide pieces 206 and 207 (Fig. 20) on the flanges 175 of the side plates 173 and then on top of a ticket chute 208 (Figs. 1, 5, 6 and 12). The guide piece 207 (Fig. 20) is constructed so that the stud on the destination device slides thereon as the device passes out of the member 174. The ticket chute 208 is fast on the forward end of the base of the machine and the top of the chute is provided with guides 209 (Figs. 5 and 12) between which the destination device slides. Fast on the cabinet of the machine is a chute 210 (Figs. 6 and 12) which is in alinement with the top of the ticket chute so that the destination device slides into the chute 210 and is arrested by a trap 213 pivoted on the chute 210. As shown in Fig. 6 when the destination device is arrested by the trap 213 it projects partly out of the machine so that it may be removed readily by the fingers of the operator, the trap 213 being operated by spring means (not shown) to permit removal of the device.

When the lever 190 (Fig. 7) is rocked clockwise a projection or flange 215 on the lever 190 and normally projecting into the chute 165 is moved out of engagement with the forward end of the destination device which has been inserted into the upper end of the chute 165, the projection being provided to prevent one destination device passing through the chute until the destination device in the frame 170 is released to permit it to be removed from the machine. The projection 215 moves through an opening (not shown) formed in the chute 165 for this purpose. Restoration of the bar 197, lever 190 and the rod 184 in normal position is effected by a spring 216 (Figs. 1 and 7) when the operator removes his hand from the lever 190.

In order to prevent a destination device passing directly through the member 174 and out of the machine when the projection 215 is moved from under the device and the rod 184 is moved forwardly from under the previously inserted destination device, as above described, the following described means is provided to prevent the inserted device from passing into the member 174 until the rod 184 has been restored to normal position under the lower end of the member 174. This device includes a lever 218 (Figs. 1, 7 and 12) pivoted on the stud 200. The lever 218 at its upper end carries a rod 219 and at its lower end is provided with a slot 220 through which a pin 223 on the bar 197 projects. When the bar 197 is lowered by operation of the lever 190, as above described, the pin 223 moves in the slot 220 to rock the lever 218 counter clockwise (Figs. 7 and 12), thereby carrying the rod 219 into the path of the new destination device so that the device will be arrested by the rod 219 while the rod 184 is in the forward ends of the slots 189. Upon return movement of the lever 190 and bar 197 to normal position the lever 218 is rocked clockwise to normal position to carry the rod 219 out of engagement with the inserted destination device to permit the latter to pass into the member 174 in which it is arrested by the rod 184 which has been restored to normal position upon movement of the bar 197 to normal position.

In order to lock the lever 190 against operation during an operation of the machine an arm 225 (Figs. 7 and 44) is provided with a projection or flange 226 adapted to engage under a shoulder 227 on the bar 197. The arm 225 is pivoted on the cross rod 115 and is connected by a link 228 to an arm 229 fast on the shaft 103. When the shaft 103 is rocked counter clockwise (Fig. 7) upon release of the machine, as above described, the arm 225 is rocked to move its flange 226 under the shoulder 227, thereby locking the lever 190 and bar 197 against operation. Then near the end of the operation of the machine when the shaft 103 is rocked back to normal position the arm 225 is moved out of locking into normal position.

If the motor key 116 (Fig. 3) is operated while the lever 190 is in moved position it can be seen that when the lug 110 moves from under the pin 108 the spring 107 (Fig. 8) rocks the shaft 103 slightly counter clockwise (Fig. 7), this movement of the shaft being arrested by engagement of the flange 226 of the arm 225 with the edge of the bar 197 above the shoulder 227. Under such condition the shaft 103 could not be rocked far enough to effect release of the machine and the friction existing between the flange 226 and the bar 197 might be sufficient to retain the bar 197 and lever 190 in operated position against the action of the spring 216 when the operator removes his fingers from the lever 190. If this should happen the operator not being able to operate the machine might consider it as being out of order, and in order to prevent such a contingency the following described device is employed. An arm 233 (Figs. 7 and 44) is pivoted on a stud 234 projecting from the chute 165. When the lever 190 is operated a roller 235 thereon coöperates with the arm 233 to rock the latter clockwise (Fig. 7). During this movement of the arm 233 the edge 237 thereof engages the flange 226, thereby rocking the shaft 103 slightly clockwise through the arm 225, link 228 and arm 229 to raise the pin 108 out of engagement with the block 110. Therefore, it can be seen that when the lever 190 is in its operated position the motor key is not held in operated position by the pin 108 and the flange 226 (Fig. 7) does not retain the lever in operated position.

*Means for moving the destination devices to printing position.*

Upon operation of the machine the destination device carrying frame 170 is rocked from its normal position shown in Figs. 3 and 5 to the position shown in Fig. 12 to carry the inserted destination device into position to control the differential mechanism of the machine, and while the device is in this position an impression is taken from it upon the ticket to be issued. The frame 170 is given this movement by rearward movement of the rod 184 in the slots 189 formed in the frames 177. During this rearward movement of the rod 184 it remains under the destination device so that the latter is retained in the member 174 of the frame during rocking movement of the latter. To move the rod 184 rearwardly a link 240 (Fig. 3) is loose at its forward end on a cross rod 243 supported by the arms 187 and at its rear end is pivoted to an arm 244 which is pivoted at its lower end on one of the frames 177. The arm 244 is connected by a link 245 to a lever 246 pivoted on a cross rod 247. The lever 246 at its upper end carries a roller 248 (Fig. 4) projecting into a cam groove formed in the face of a disk 249 fast on the shaft 71. This cam groove is so constructed that the rod 184 is moved rearwardly to rock the frame 170 from the position shown in Fig. 3 to the position shown in Fig. 12 near the beginning of the operation of the machine and retained in such position until near the end of the operation of the machine when it is restored to normal position. Near the end of the rearward movement of the rod 184 portions 250 of the slots 189 raise the rod 184 slightly to elevate the destination device for a purpose to be described later.

As the rod 184 is not connected to the frame 170, arms 253 (Figs. 3 and 7) are employed to restore the frame 170 to normal position when the rod 184 is moved forwardly in the slots 189 to normal position. The arms 253 are pivoted at 254 on the frames 177 and connected by links 255 to the arms 187. Pins 256 on the side plates 173 of the frame 170 project through slots 257 formed in the arms 253. These slots 257 are so constructed that when the arms 253 are rocked counter clockwise (Figs. 3 and 7) by the arms 187 through the links 255 during rearward movement of the rod 184 they move over the rollers 256 to assist the rod 184 in rocking the frame 173 counter clockwise and the slots also prevent overthrow of the frame. Then when the arms 253 are rocked clockwise to normal position during forward movement of the rod 184 the slots 257 rock the frame 170 positively to normal position. In order to insure downward movement of the destination device in the member 174 when the rod 184 is lowered and moved forwardly in the portions 250 of the slots 189 an edge 261 on an arm 262 (Fig. 5) fast on the chute 165 engages the upper edge of the destination device during such movement of the rod 184 and forces the destination device down with the rod 184.

It is desirable to aline the carrying frame 170 in normal position to insure passage of the destination device from the chute 165 into the member 174 of the frame 170 and to aline it in its moved position so that the destination device will be in exact position necessary for it to control the differential mechanism and for it to print on the ticket to be issued. The means for performing this function comprises two arms 260 (Figs.

3, 7 and 12) fast on a shaft 263. The arms 260 carry rollers 264 for coöperating with slots 265 and 266 in the side plates 173 of the frame 170. Fast on the shaft 263 is an arm 267 (Figs. 3 and 45), provided with a recess through which a roller 268 on a lever 269 projects. The lever 269 is pivoted on the cross rod 247 and carries a roller projecting into a cam groove 270 formed in the left hand face of the disk 128. The cam groove 270 is so constructed that the rollers 264 on the arms 260 are normally in the slots 265 of the frame 170 to aline the latter in normal position. During the operation of the machine the rollers 264 are moved out of the slots 265 and then after the frame 170 has been moved to the position shown in Fig. 12 the rollers 264 are moved into the slots 266 to aline the frame in this position. Before the frame 170 is moved to normal position the rollers 264 are moved out of the slots 266 and are moved into engagement with the slots 265 after the frame 170 has been restored to normal position.

*Impression means for destination devices.*

The means for carrying the ticket to be issued against the inserted destination device while it is in printing position will now be described. A platen frame 275 (Figs. 5, 12, 13, 14 and 16) has two arms 276 pivoted on the rods 176. A platen 277 (as best shown in Fig. 16) is carried on a frame 278 which is provided with slots through which screws 279 on the platen frame project to permit adjustment of the platen relative to the frame 275. Mounted between the frame 278 and the frame 275 is a block 280 adapted to be adjusted by a screw 283 for the purpose of moving the frame 278 and platen so that the platen makes an impression of the desired distinctness on the ticket from the destination devices.

A frame 284 (Figs. 5, 12, 13 and 14) called the "ticket retaining frame" herein has two arms 285 pivoted on the rod 176. The frame 284 carries plates 286 having flanges 287 which project over a ticket when the latter is on the platen 277. The frame 284 has a projection 288 (Figs. 13 and 14) which projects through a slot 289 (Fig. 14) formed in a curved plate 290 mounted on a frame 293 fastened to the frames 177. The frame 284 is retained in the normal position shown in Fig. 13 by engagement of the projection 288 over the nose on an arm 294 pivoted on a stud 295 carried by a rearwardly extending projection 291 of the plate 290. A spring 296 connected to an arm 297 fast to the arm 294 through a sleeve on the stud 295 normally retains the arms 294 and 297 in the position shown in Fig. 13.

The left hand side arm 276 (Fig. 13) of the platen frame 275 is connected by a pin 2971 to the forward end of a link 298 which at its rear end is connected to a lever 299 (Fig. 15) pivoted on the cross rod 247. The lever 299 carries a roller projecting into a cam groove formed in a disk 300 fast on the shaft 71. This cam groove is constructed so that the platen and ticket retaining frames near the beginning of the operation of the machine are moved to the positions shown in Fig. 12. In this position of the ticket retaining and platen frames the retaining frame is in engagement with a projection 303 of the frame 293 and the platen frame rests upon the ticket frame so that the platen is clear of the flanges 287 to permit the end of a ticket strip to be fed over the platen and under the flanges. At the very beginning of this movement of the platen frame a pin 301 (Fig. 13) on the right hand arm 276 engages a nose 302 on the arm 297 and rocks the arms 294 and 297 against the action of the spring 296 to move the nose on the arm 294 from under the projection 288 on the ticket retaining frame 284. When the pin 301 passes out of engagement with the nose 302 the spring 296 rocks the arms 294 and 297 clockwise, such movement being limited by engagement of a pin 304 on the arm 294 with the plate 290. When the platen and ticket retaining frames are restored to normal position the projection 288 and pin 301 respectively wipe past the noses on the arms 294 and 297. After the end of the ticket strip has been fed over the platen it is severed by severing mechanism, to be described later. The mechanism for feeding the ticket strip over the platen will also be described later. After the ticket has been severed the cam groove in the disk 300 restores the platen frame 275 to normal position. During this return movement the platen frame has a slight initial movement independent of the retaining frame 284 so that the platen carries the ticket against the flanges 286 to hold the ticket on the platen.

Just as the platen frame 275 reaches normal position, independent means now to be described rocks this frame to carry the ticket once or twice against the destination device to print from the device the consecutive number, the class and the destination station on the ticket. Two arms 305 (Figs. 3, 10 and 11) are pivoted on the cross rod 247 and are rigidly connected by cross bar 306. The forward ends of the arms 305 are provided with cam slots 307 adapted to coöperate with rollers 308 (Figs. 3, 13 and 16) on arms 309 carried by the platen frame 275. When the arms 305 are rocked clockwise (Figs. 3 and 10) by means to be described presently the slots 307 pass over the rollers 308 and move the platen frame to carry the ticket against the destination device to take a printing impression. This movement of the platen frame by the arms 305 raises the retaining frame 284 (Fig. 13) to normal position. During this movement of the frame 284 to normal position its projection 288 moves above the nose on the arm 294 and is therefore latched in normal position by this nose so that when the platen frame is rocked back to normal position by the arms 305 the retaining frame is not moved.

When the platen frame 275 moves slightly clockwise (Fig. 5) to normal position independent of the retaining frame 284 after the first impression is taken on a "round trip" ticket or after the single impression is taken on a "one way" ticket the ticket is released from between the platen 277 and the flanges 287 and falls one-half its length, it being arrested by engagement of its lower edge with a lug 313 (Figs. 7 and 20) projecting from the under side of the right hand flange 175 of the carrying frame 170. When the frame 170 is moved from the normal position shown in Fig. 7 to the position shown in Fig. 12 the lug 313 is moved into the path of movement of the ticket to prevent the ticket from falling through the ticket chute 208 immediately upon its release by the receding movement of the platen frame. Upon movement of the frame 170 to normal position the lug 313 is carried away from under the ticket and the latter falls through the ticket chute to the position shown in Fig. 6. As shown in this figure the ticket is arrested at the end of the chute by spring arms 314 which yieldingly engage forwardly projecting arms 315 of the chute 208. The ticket may be removed by the fingers of the operator from between the arms 315 and the arms 314 which project from a frame 316 pivoted on the ticket chute (Figs. 5 and 12). If a "round trip" ticket is to be issued it is carried against the destination device both before and after it is moved into engagement with the lug 313, but if a "one way" ticket is to be issued it is carried against the destination device only before the ticket moves into engagement with this lug.

The means for operating the arms 305 (Figs. 3, 10 and 11) will now be described. A disk 317 (Fig. 5) having a cam groove 318 is provided to operate the arms 305 but once during an operation so that the platen frame will carry the ticket but once against the destination device to print on a "one way" ticket. A disk 319 (Fig. 10) is provided with a cam groove 320 to operate the arms 305 and the platen frame twice to carry the ticket against the destination device twice to print on a "round trip" ticket. These cam disks which are fast on the shaft 71, rock the arms 305 through a lever 323 (Figs. 5, 10 and 11) which is slidably mounted on the cross rods 247 and 306. The arm 323 carries a roller 324 adapted to project into the cam groove 318 when a "one way" ticket is to be issued and the lever carries a second roller 325 which projects into the cam groove 320 when a "round trip" ticket is to be issued. The lever 323 is shifted laterally upon the cross rods 247 and 306 to carry one roller or the other into engagement with its respective cam groove 318 or 320 by operation of a hand lever 326 (Figs. 7, 10 and 11) before the operating mechanism for the machine is released. The hand lever 326 is fast on a shaft 327 on which is also fast a cam 328 having a cam groove 329 formed in its curved bar 330. A sleeve 333 which is adapted to slide laterally on a cross rod 334 has an arm 335 provided with a roller 336 projecting into the cam groove 329. The cam groove 329 is so constructed that upon clockwise movement (Fig. 10) of the lever 326 from its "one way" or upper to its "round trip" or lower position the groove 329 shifts the sleeve 333 to the right while reverse movement of the lever from its lower to its upper position shifts the sleeve to the left. When the sleeve 333 is shifted to the right an arm 338 on the sleeve engages the lever 323 and shifts the lever toward the right to carry the roller 325 into the cam groove 320. When the sleeve is shifted toward the left an arm 339 (Fig. 11) on the sleeve shifts the lever 323 toward the left to carry the roller 324 into the cam groove 318. From the above description it can be seen that if the roller 324 is in the cam groove 318 a ticket is carried once against the destination device to print a "one way" ticket and if the roller 325 is in the cam groove 320 the platen is operated to carry the ticket twice against the destination device to print on a "round trip" ticket.

The lever 326 is alined in one of its two positions by engagement of a roller 340 (Fig. 7) in one of two notches 343 formed in the lever. The roller 340 is carried on an arm 344 which is operated by a spring 345 to move the roller into one or the other of the notches 343.

To lock the lever 326 against movement during operation of the machine the lever is provided with two notches 346 (Fig. 7) into one or the other of which a roller 347 passes upon release of the operating mechanism. The roller 347 is carried by a slide 348 which is provided with slots 349 through which the shaft 327 and a shaft 350 project to guide the bar in its movement. The slide 348 is provided with a recess 353 into which projects a pin 354 projecting from an arm 355 fast on the shaft 103. When the shaft 103 is rocked counter clockwise (Fig. 7) to effect release of the machine the slide 348 is lowered to move the roller 347 into one of the notches 346 to lock the lever 326 against movement. When the shaft 103 is restored to normal position near the end of the operation of the machine the slide 348 is raised to move the roller 347 out of the notch 346. It is clear that the construction just described serves to prevent rocking of the shaft 103 and consequently release of the machine when the lever 326 is not in either of its proper positions of adjustment as the roller 347 when the motor key 116 is operated, engages the edge 356 of the lever 326 between the notches 346 and prevents rocking of the shaft 103. It is also clear that after the machine has been released, the engagement of the roller 347 with one or the other of the notches 346 prevents shifting the lever 326 to a different position until operation of the machine is completed.

In order to insure movement of the ticket into engagement with the lug 313 (Fig. 7) on the frame 170 after a ticket has been carried against the destination device to take the first impression the following described means is employed. An arm 358 (Figs. 4 and 12) is provided with a slot 359 through which the shaft 263 projects. A roller 363 projecting from an arm 364 mounted on the shaft 263 and a cross rod 365 projects through a slot 366 in the arm 358. Pivoted at 367 on the arm 358 is an arm 368 provided with a slot 369 through which the stud 363 projects. An arm 370 pivoted on the cross rod 247 carries a pin 373 projecting through a slot 374 in the arm 358. The arm 370 carries a roller 375 (Fig. 41) projecting into a cam groove 376 formed in the left hand face of the disk 317. This cam groove is so constructed that the arm 358 is rocked first counter clockwise (Figs. 4 and 12) about the shaft 263 and then clockwise to normal position. During the clockwise movement of the arm 358 a nose 377 on the arm 368 engages the upper edge of the ticket to move it into engagement with the lug 313. The slot 366 is so constructed that when the arm 358 is rocked the arm is slid backward and forward on the shaft 263 so that the nose 377 of the arm 368 remains in engagement with the ticket during return movement and does not engage the destination device which would be the case if the nose 377 of the arm described an arc with the shaft 263 as the center.

*Inking ribbon.*

An inking ribbon 380 (Figs. 2 and 3) through which the destination devices print on the tickets is fed from one of two rolls 383 (Figs. 1, 2 and 3) and stored on the other roll. These rolls 383 are mounted on a frame 384 fast on the member 174. The ribbon passes from one spool under rods 385 on the member 174 onto the other spool, openings in the member being provided to permit the ribbon to pass under the rods 385. Operating pawls (not shown) cooperate with ratchets 387 on the spool 383 and are carried by a lever 388 (Fig. 3) provided with a roller 389 projecting through a slot 390 in the left hand frame 177. When the destination carrying frame 170 is rocked counter clockwise (Fig. 3), as above described, the lever 388 is rocked through coöperation of the roller 389 and the slot 390 whereupon the pawls coöperate with the ratchets 387 to feed the ribbon. This feeding means is not shown or described in detail in the present invention as any desired form of feeding mechanism may be employed and the preferable type of mechanism employing two pawls for reversibly feeding the ribbon is well known in the art.

*Ticket ejecting mechanism.*

In order to insure movement of the printed ticket from over the platen 277 to the position shown in Fig. 6 the following described ticket ejecting mechanism is employed.

A lever 393 (Figs. 12 and 17) is pivoted on a pin 394 projecting from an arm 395 fast on the plate 290. Pivoted on a pin 396 projecting from the lever 393 is a lever 397 on which is pivoted at 398 a pawl 399. A spring 400 (Figs. 5 and 12) interposed between the pin 396 and a pin on an arm 403 tends to rock the lever 393 counter clockwise (Fig. 5) about the pin 394 but such movement is prevented by engagement of a shoulder 4051 (Fig. 17) on the lever 397 with a shoulder 4061 on the arm 395. A spring 4071 is interposed between a projection on the lever 397 and the pawl 399 and normally retains the pawl 397 in the position shown in Fig. 5 in which position the rear end of a slot 4081 (Fig. 17) in the pawl 399 engages a pin which is on the lever 397 and projects through the slot. A spring 4101 is coiled about the pin 396 and is bent at its ends about the levers 393 and 397. A lever 4131 is pivoted on a pin 4141 projecting from the lever 393. A spring 4151 coiled about the pin 4141 serves normally to retain a pin 4161 on the lever 413 in engagement with the lower edge of the lever 393. A laterally extending projection or flange 4181 on the lever 4131 normally projects under the projection 288 on the retaining frame 284 as shown in Fig. 5. When the frame 284 is moved from the normal position shown in Fig. 5 to the position shown in Figs. 12 and 17 its projection 288 engages the flange 4181 thereby moving the lever 393 and parts carried thereon to the position shown in these latter figures. During this movement the pin 4141 engages an edge 4191 on the arm 403 thereby rocking this arm and a shaft 4171 carrying the arm counter clockwise (Fig. 12) against the action of the spring 400 until the pin 4141 passes off of the edge 4191 whereupon the spring 400 moves the arm 403 to normal position to move a shoulder 4201 on the arm 403 back of the pin 4141, thereby retaining the lever 393 in the position shown in Figs. 12 and 17. When the shoulder 4201 passes back of the pin 4141 the projection 288 passes out of engagement with the flange 4181 of the lever 4131. When the retaining frame 284 is moved to normal position as above described its projection 288 wipes past the lever 4131. Fast on the shaft 4171 which is mounted in a frame 4211 is an arm 4231 (Fig. 7) normally engaging a projection 4241 on the right hand arm 187. When the arms 187 are rocked counter clockwise (Fig. 7) to move the rod 184 rearwardly the spring 400 (Fig. 5) rocks the arm 4231, shaft 4171 and arm 403 slightly counter clockwise (Fig. 5), such movement being limited by engagement of an arm 4251 on the shaft 417 with the base of the machine. Then the lever 393 is latched by the arm 403 in the position shown in Figs. 12 and 17 as above described. When the arms 187 are rocked clockwise (Fig. 7) to normal position the projection 4241 rocks the arm 4231, shaft 4171 and arm 403 to move the shoulder 4201 out of engagement with the pin 4141 whereupon the spring 400 rocks the lever 393 to normal position. During this return movement of the lever 393 a point 4261 on the pawl 399 engages the ticket and is rocked counter clockwise (Fig. 12) against the action of the spring 4071 and then the spring rocks the pawl clockwise. Movement of the pawl in this manner moves the ticket into the position shown in Fig. 6. The spring 4101 (Fig. 17) is also provided so that when the shoulder 4051 on the lever 397 engages the shoulder 4061 the lever 397 is rocked slightly counter clockwise (Fig. 7) to accelerate the movement of the ticket.

*Operation of consecutive numbering devices in destination devices.*

During clockwise movement (Fig. 19) of the frame 170 the consecutive numbering device (Fig. 25) carried by the inserted destination device is operated by a pawl 4301 (Figs. 19 and 21) to add one thereon. This pawl 4301 is fast on a stub shaft 4331 journaled in the frame 170. A spring 4341 interposed between a projection 4351 on the frame 170 and an arm 4361 on the shaft 4331 retains the pawl 4301 in the normal position indicated by the dotted lines in Fig. 19. Fast on the shaft 4331 is an arm 4371 which is engaged by a pin 4381 on the link 240, when the latter is drawn rearwardly, as above described, to rock the pawl 4301 to the position indicated in full lines in Fig. 19. During this movement of the pawl 4301 its nose 4391 passes through an opening 4401 (Fig. 25) in the casing of the destination device and into engagement with a flange 4431 on the arm 146 to rock the arm and thereby actuate the consecutive numbering device through the pawl 145 (Fig. 26.)

*Printing means retained in the machine.*

The ticket strip 444 (Fig. 3) from which tickets are severed is fed from a supply roll (not shown) under the machine through a chute 405 (Figs. 3, 4 and 5) between a feeding and printing roll 406 and a coöperating impression roll 407 through a chute 408 mounted on a cross rod 409 and a shaft 410, between an electro cylinder 413 and its coöperating impression roll 414 and thence through an opening 415 (Fig. 5) in a stationary knife 416 over the platen 277 which has been lowered to the position shown in Fig. 12 before the strip is fed forward. The printing roll 406 (Fig. 5), which is of an ordinary construction and fast on the shaft 417 may be provided with any desired form of printing electro and a consecutive numbering device 418 of any well known construction and shown conventionally in the drawings. This consecutive numbering device 418 prints the consecutive number on all of the tickets issued by the machine upon the backs of the tickets as shown in Fig. 31 and the electro prints the other data shown in this figure. An inking roller 419 (Figs. 3, 4 and 5) is mounted in a pivoted frame 420 and is retained in engagement with the printing roll 406 by a spring 423 so that it inks the electro and the consecutive numbering device. The impression roll 407 (Fig. 5) is mounted on an eccentric 424 which is loose on a cross rod 425 and adjustable by a plate 426 (Fig. 2) to secure the proper engagement between the impression roll and printing roll 406 as is well understood in the art.

Date wheels 428 (Figs. 5 and 43) for printing the date on the front of the tickets (Figs. 29 and 30) are mounted on a cross rod 429 carried by a cylinder 430 fast on the left hand end of a shaft 433 (Figs. 7 and 43). The right hand end of the electro cylinder 413, as shown in Fig. 7, is splined on the shaft 433 by a feather 434 and at its left hand end the cylinder is mounted in a hub or boss 435 (Fig. 1) on the left hand side frame of the machine. The date wheels are adjusted through pinions 437 (Figs. 5 and 43) which mesh with pinions on the date wheels and are fast on sleeves 438 and a shaft 441 rotated by turn buttons 440 (Fig. 1). It can be seen from this construction that the electro cylinder 413 rotates with the shaft 433 and is shiftable longitudinally of the shaft without shifting the date wheels and cylinder 430.

The electro cylinder 413 is provided with two printing electro plates 443 (Fig. 5) and is slidable laterally on the shaft 433 and cylinder 430 to move one printing surface into position to print the names of the issuing railroad and station upon a "one way" ticket (Fig. 29) and to move the other electro plate into position to print the same data upon both portions of a "round trip" ticket (Fig. 30). As the date wheels 428 are not shifted they print the date once on both "round trip" and "one way" tickets. A perforating blade 431 (Fig. 5) perforates the round trip ticket to facilitate the tearing of the two portions of the ticket from each other.

For the purpose of shifting the electro cylinder 413 to bring the desired printing plate into printing position the sleeve 333 (Figs. 4, 10 and 11) above described, carries an arm 445 engaging in an angular groove 446 (Fig. 10) formed in the cylinder 413. Through this means when the hand lever 326 is adjusted from one of its positions to another to prepare the arms 305 for carrying the ticket once or twice against the destination device the electro cylinder 413 is shifted so that upon rotation of the cylinder the latter, together with the inserted destination device prints a "one way" or "round trip" ticket, dependent upon the adjustment of the lever 326. An inking roller 447 (Fig. 3) for inking the printing electro plates on the cylinder 413 and the date wheels 428 is mounted in a frame 448 pivoted on the chute 408. A spring 449 connected to the frame 448 serves to retain the inking roller 447 in engagement with the electro cylinder 413. The impression roller 414 (Fig. 5) is loose on an eccentric 450 adapted to be adjusted by a plate 454 (Fig. 2) to maintain the proper pressure between the impression roll 414 and the electro cylinder 413. The upper end of a spring 455 (Fig. 5) which is connected at its lower end on the ticket chute 405 projects into the chute to engage the ticket strip for the purpose of preventing backward movement of the strip.

In order to feed the printed end of the ticket strip into position over the platen 277 as quickly as possible after the platen frame 275 has been moved into position to receive the end of the strip so that sufficient time may be allowed for carrying the ticket against the inserted destination device the gearing for driving the above described feeding mechanism is constructed to accelerate its movement during the feeding of the strip. This gearing will now be described. Fast on the shaft 71 (Figs. 8 and 9) is an elliptical gear 457 meshing with a similar elliptical gear 458 (Fig. 8) pivoted on the cross rod 247. Also loose on the cross rod 247 but connected to a hub 459 (Fig. 9) of the gear 458 is a gear 460 (Figs. 7 and 9). The gear 460 meshes with a gear 463 fast on a sleeve 451 connected to the impression roll 414 (Fig. 5). A gear 464 also fast on the sleeve 451 meshes with a gear 465 fast on the shaft 483. An intermediate gear 466 meshes with the gear 463 and a gear 467 fast on the shaft 417 carrying the printing roll 406. A gear 468 also fast on the shaft 417 meshes with a gear 469 fast on a sleeve 471 connected to the impression roll 407. This gearing is so constructed that upon each operation of the machine the printing roll 406, the electro cylinder 413 and the corresponding impression rolls are given one complete rotation, the printing roll 406 being provided with the usual feeding flanges for coöperating with the impression roll 407 to feed the strip forwardly. The elliptical gears 457 and 458 are so proportioned that the speed of rotation of the impression rolls 407 and 414 and the printing roll 406 and electro cylinder 413 is increased while the feeding of the strip is being accomplished so that sufficient time will remain for printing from the destination device onto the ticket.

Severing mechanism.

After the forward end of the ticket strip has been fed over the platen 277 it is severed by the coöperation of a movable knife 475 (Figs. 5 and 23) with the stationary knife 416 fast on the frames 177. The movable knife 475 is pressed by spring plungers 476, mounted in a block 477 on one of the frames 177 against the stationary knife 416. Arms 479 fast on the shaft 410 are provided with recesses through which project studs 483 mounted on rearwardly extending projections on the movable knife 475. An arm 484 (Fig. 7) also fast on the shaft 410 carries two oppositely extending rollers 485 and 486 for coöperating with cams 487 and 488 respectively. These cams are fast on the shaft 417 and are so constructed that the movable knife 475 (Fig. 5) is lowered to permit the feeding of the ticket strip and then at the end of this feeding movement of the strip the knife is raised to sever the ticket from the strip.

A slide 490 (Figs. 5 and 23) is provided with a slot through which a pin 493 on the stationary knife 416 projects. A pin 494 on the movable knife 475 projects through a slot 495 also formed in the slide 490. A spring 496 is compressed between the upper end of the slot 495 and the pin 494 so that when the movable knife is raised to normal position to sever the ticket from the strip a flange or projection 497 on the upper end of the slide 490 yieldingly forces the strip against a flanged piece 498 fast on the stationary knife to grip the strip during the severing of the ticket therefrom, the strip in this manner being retained in position to be severed at the proper line. When the movable knife is lowered to permit the feeding of the ticket through the opening in the stationary knife the pin 494 engages the lower end of the slot 495 in the slide 490 and carries the latter downwardly to disengage its flange 497 from the ticket strip.

*Amount differential mechanism.*

Loosely mounted on a cross rod 500 (Figs. 4 and 5) are a plurality of differentially movable members or segments 503 carrying actuating racks 504 and transfer arms 505 for operating totalizer pinions 502 of the totalizer, there being one actuating rack for each pinion. The cross rod 500 is mounted in frames 506 (Fig. 4) which are supported on a cross rod 507 and a shaft 508. There is one of these frames 506 for each differentially movable member 503. The members 503 are moved counter-clockwise (Fig. 4) to different extents and then moved clockwise to normal position under the control of the amount holes 159 (Figs. 24 and 26) in the inserted destination device.

Segmental rack portions 509 of the members 503 mesh with corresponding gears 513 fast on nested sleeves 514, which carry type carriers 511 (Fig. 1) for printing on a detail strip. The gears 513 also mesh with teeth 516 on corresponding racks 517 (Figs. 4, 5, 33 and 34). The racks 517 are provided with slots 518 (Figs. 5 and 33) through which cross rods 519 project to guide the bars in their movements. Pivotally mounted at 520 (Fig. 33) on each rack 517 is a latch 523 provided with a slot 524 engaging over a pin 525 projecting from a corresponding bar 526 which is to the right of the rack and mounted on the cross rods 519 in the same manner. A spring 522 is interposed between a pin 527 on a projection 528 of each rack 517 and a pin 529 on the corresponding latch 523 and normally retains the slot 524 in the latch in engagement over the pin 525. Mounted on the cross rods 519 in the same manner as the racks 517 and immediately to the left of each rack is a finger bearing bar 530 having a projection 532 with a slot 533 through which a pin 534 on a forwardly extending arm 531 of the corresponding latch 523 projects. A pin 535 on the bar 530 projects through a slot 536 in the corresponding rack 517 to limit the relative movement between the bar and the rack. Each bar 526 at its upper end carries a roller 537 (Fig. 4) projecting into a recess 538 formed in a corresponding arm 539 pivoted on the shaft 103. The arms 539 are connected by links 540 to corresponding arms 543 pivoted on the shaft 508. The arms 543 are connected to the upper ends of corresponding pitmen 544 which at their lower ends are forked over the shaft 77. The pitmen 544 carry rollers projecting into cam grooves 545 formed in corresponding disks 546 fast on the shaft 77. These cam grooves 545 are so constructed that the bars 526 are lowered to invariable extents on the cross rods 519 and then raised to normal position.

It can be seen that while the latches 523 are in the positions shown in the Fig. 33 the racks 517 and the bars 530 are connected to the bars 526 by the latches and therefore move with the bars 526. The lower ends of the bars 530 of the four lowest denominations are provided with fingers 550 which, as shown in Fig. 34, are bent so that their ends are in exact alinement with the corresponding amount holes 159 formed in the destination device when the latter has been moved to the position shown in Fig. 12 by the rearward movement of the cross rod 184 in the slots 189. The fingers 550 project through slots or holes in the cross bar 551 of a frame 552 (Figs. 3 and 4) mounted on the shaft 327 and the lower cross rod 519, the fingers being guided in this manner.

Having described the several parts of the differential mechanism for operating the totalizer under the control of the destination devices it will be well now to explain the operation of these parts as a whole in view of the above description. At the beginning of the operation of the machine the destination carrying frame 170 is moved to the position shown in Fig. 12 and then as the rod 184 moves in the upwardly and rearwardly extending portions 250 of the slots 189 the destination device is raised slightly in the member 174. The amount holes 159 of the destination device when in this position are in direct operative alinement with the fingers 550 on the lower ends of the bars 530. The destination device is raised slightly in the member 174 so that the lower ends of the fingers 550 are in the same plane as the rear end of the block 158 in which the amount holes 159 are formed. While the destination device is in this position the cam disks 545 (Fig. 4) through the pitmen 544, arms 543, links 540 and arms 539 move the bars 526 downwardly an invariable extent which is equal to nine steps of movement of the racks 517. The racks 517 and the bars 530 being normally connected to the bars 529 of the latches 523 move with the bars 526 until the lower ends of the fingers 550 of the racks 517 engage the stops 163 forming the bottom of the amount holes 159. When a finger 550 engages a stop 163 movement of the bar 530 carrying the finger is arrested. Then the rack 517 is moved slightly farther until the upper end of the slot 536 (Fig. 33) engages the pin 535 whereupon movement of the rack 517 is also arrested. During this slightly relative movement between the rack 517 and bar 530 the latch 523 is rocked counter clockwise (Fig. 33) about its pivot 520 as the pin 534 on the latch projects into the slot 533 of the arrested bar 530. When the latch 523 is rocked in this manner its slot 524 is moved out of engagement with the pin 525 on the bar 526 so that the bar 526 may continue its movement independently of the rack 517 and bar 530. This differential movement of the bar 517 is imparted to the differentially movable member 503 (Fig. 4) carrying the corresponding actuating rack 504 through the appropriate gear 513. During return movement of the bar 526 to normal position its pin 525 engages the underside of a nose 560 on the latch 523 thereby raising the latch 523 and the rack 517 relative to the bar 530. During this relative movement the spring 522 rocks the latch 523 to normal position to reëngage the slot 524 in the latch over the pin 525 so that the rack 517 and the bar 530 are restored to normal position with the bar 526. This return movement of the bars 526 is effected before the destination device carrying frame 170 is restored to normal position so that the fingers 550 are out of the holes 159 in the destination device when the latter is moved.

In order to hold the rack 517 down in moved position and thereby prevent it from rebounding when it is disconnected from its driving bar 526 the following device is employed. A bent projecting portion 563 (Fig. 33) formed on the forward edge of each rack 517 carries two studs 564 and 565. A roller 566 mounted on the stud 564 is engaged by the head on the lower end of a pin 567 mounted to slide in the stud 565. A spring 568 coiled about the pin 567 serves to keep the head of the pin in engagement with the roller 566. The outer edge 569 of the projection 528 of the rack 517 is inclined and engaged by the roller 566. A projection 570 on the bar 526 normally engages the roller 566 and retains it in the position shown in Fig. 33 so that the lower side of the pin 564 engages the roller. When the movement of the rack 517 is arrested the projection 570 moves out of engagement with the roller 566 whereupon the spring 568 through the pin 567 moves the roller 566 downwardly relative to the pin 564 and into engagement with an edge 573 of a corresponding bar 574 mounted on the cross rods 519. Spacing collars 575 on the cross rod 115 serve to properly space the bars 574. When a roller 566 is in engagement with the edge 573 and edge 569 it can be seen that the rack 517 cannot be raised as a tendency to such movement wedges the roller 566 between these and thereby prevents such movement. As the bar 526 is raised to the position in which it was disconnected from the rack 517 the projection 570 of the bar engages the roller 566 to move it out of engagement with the edge 573 so that during continued movement of the bar 526 the rack 517 is moved with it, being then coupled thereto by the latch 523.

As there are no more than four amount holes 159 in the destination devices it is clear that the latter control differential movement of but four of the differentially movable members 503 (Fig. 4) for actuating the totalizer. There are provided totalizer wheels of higher orders than those actuated directly under the control of the destination devices, these higher order totalizer elements being operated in adding operations only when transfers to them are necessary. In total and subtotal printing operations these totalizer elements of higher orders control the positioning of the corresponding type carriers 511 as will be described later. The differential units shown in Figs. 3 and 4 for actuating these totalizer elements of higher orders are the same as those controlled by the destination devices, except that their bars 530 are not provided with fingers 550 which are on the bars 530 whose extents of movement are controlled by the destination devices. In order to prevent movement of the bars 530 appropriate to the totalizer wheels of higher orders during adding operations in which destination devices are used to print on tickets a cross bar 580 (Figs. 4 and 35) of a yoke 583 projects under the lower edges 585 of the projections 532 on the bars 530. During the first step of movement of the corresponding driving bars 526 the bar 580 arrests the bars 530 and the latter with the racks 517 are therefore disconnected from the driving bars. When the machine is prepared for printing a total or subtotal the yoke 583 is operated to move its bar 580 rearwardly from under the edges 585 and thereby permit differential movement of the bars under the control of the corresponding totalizer pinions, as will be described later.

No means is provided in the present invention for preventing operation of the machine when a destination device is not in the machine and the latter is not prepared for printing a total or subtotal. It can be seen that if the machine were operated when no destination device was in the machine and no means were provided to prevent movement of the differential units normally controlled by the destination devices, these units would be moved nine steps and actuate the totalizer accordingly, and a valid ticket would not be printed during the operation. To prevent operation of these amount differential units during such operation of the machine the following described device is employed. A yoke 587 (Figs. 5 and 35) is pivoted on the shaft 327 upon which is also pivoted the yoke 580. A spring 588 (Fig. 5) serves to retain the yoke in the normal position shown in Fig. 5 and in this position the horizontal cross bar 589 of the yoke is under the edges 585 of the bars 530 which are adapted to be controlled by the destination devices. In case the machine is operated when a destination device is not in the machine the edges 585 engage the cross bar 589 and therefore disconnection between the driving bars 526 and the actuating racks 517 and bars 530 is effected at the very beginning of the movement of the bars 526 so that the totalizer is not actuated. An arm 590 (Figs. 4 and 35) is pivoted on the left hand side of the yoke 587 and at its lower end has a finger 593 projecting through an opening in the cross bar 551 of the frame 552. When the destination device is raised in the member 174 of carrying frame 170 to the position shown in Fig. 12 by movement of the rod 184 in the rear ends of the slots 189 the rear end of the destination device engages the finger 593, thereby rocking the yoke 587 clockwise (Fig. 5) to move its cross bar 589 from under the edges 585 so that the differential mechanism may be moved differentially under the control of the amount holes 159 in the destination device. This movement of the yoke 587 does not effect movement of the yoke 580. When the destination device is lowered in the member 174 the spring 588 restores the yoke 587 to normal position. In total and subtotal printing operations the yoke 587 is moved out of normal effective position with the yoke 580 as will be described later so that the differential units normally controlled by the destination devices are controlled by the corresponding totalizer pinions.

While the differentially movable members 503 (Fig. 4) are in their adjusted positions the totalizer pinions 502 are moved into engagement with the actuating racks 504 so that upon return movement of the members 503 the totalizer will be actuated to add the amount represented by the amount holes 159 in the destination device employed to print on the ticket issued. While the totalizer is being moved into engagement with the actuating racks 504 the latter are alined in moved position by alining levers 595 (Figs. 4, 5 and 42). These levers are loose on the shaft 508 and are rigidly connected together by a cross rod 596 projecting through their rearwardly extending arms. Mounted on the cross rod 596 are two pitmen 597 which at their lower ends are forked over the shaft 77. The pitmen carry rollers (Fig. 42) projecting into cam grooves formed in disks 598 fast on the shaft 77. These cam grooves are so constructed that while the totalizer is being moved into engagement with the actuating racks the alining levers 595 are rocked to move their noses 599 in engagement with the actuating racks to aline the latter in moved positions.

*Totalizer.*

The totalizer will be described but briefly here as it is of the type fully shown and described in Letters Patent of United States granted to Wm. A. Chryst, June 26, 1917, No. 1,230,864, and reference may be had thereto for a more detailed description of the same. The totalizer pinions 502 are loose on a tube 500 (Figs. 3 and 4) supported in plates 603. The upper ends of the plates 603 are forked over studs 604 projecting from the end frames 506. Near their lower ends, the plates 603 carry a shaft 605 the ends of which project into slots 606 formed in plates 607 (Figs. 3, 7 and 38) fast on the side frames of the machine. Fast on the shaft 605 are arms 608 carrying rollers 609 projecting into cam slots 610 formed in the plates 607. The right hand arm 608 (Fig. 38) is connected by a link 613 to an arm 614 loose on the shaft 71. Also loose on the shaft 71 but fast to the arm 614 is an arm 615 connected by a link 616 to an arm 617. The arm 617 is fast on a sleeve 618 loose on the shaft 508. A cross rod 619 is supported by the arm 617 and an arm 620 (Figs. 7 and 40) which is also fast on the sleeve 618. The cross rod 619 normally projects between oppositely extending projections 623 on a pitman 624 (Fig. 38). The pitman 624 is provided with slots 625 through which the shaft 77 and a cross rod 626 projects to guide the pitman 624 in its reciprocations. The pitman 624 carries oppositely extending rollers 627 and 628 adapted to coöperate with cams 629 and 630 respectively fast on the shaft 77. These cams are so constructed that during adding operations during which valid tickets are issued the arms 608 and shaft 605 are rocked clockwise (Figs. 3 and 38) through the above described connections after the differentially movable members 503 have been positioned differentially and before they begin their return movement to normal position. During this movement of the arms 608 movement of the rollers 609 in the cam groove 610 raises the totalizer into engagement with the actuating racks, so that during return movement of the racks to normal position the totalizer is actuated. After the actuating racks have been restored to actuating position the totalizer is moved out of engagement therewith by the above described mechanism.

An alining plate 633 (Figs. 4 and 5) carried by two levers 634 fast on a shaft 635 supported by the plates 603 engages the totalizer pinions 502 to prevent their rotation when out of engagement with the actuating racks as fully shown and described in the above mentioned patent to Wm. A. Chryst. Cams 636 fast on the shaft 605 coöperate with the levers 634 to move the plate 633 out of engagement with the totalizer pinions when the totalizer is moved into engagement with the actuating racks and into normal engagement with the pinions when the totalizer is moved out of engagement with the racks.

*Transfer mechanism.*

The transfer mechanism is also fully shown and described in the above mentioned application of Wm. A. Chryst and will therefore be described but briefly here.

Pairs of teeth (Figs. 4 and 5) are cut in the transfer arms 505 and are mounted in alinement with the actuating racks 504. Pivoted on the transfer arms are levers 639 having pins 640 normally engaging edges 643 (Fig. 4) of the differentially movable members 503. Springs 644 normally retain pins 645 on the levers 639 in engagement with the outer ends 646, of arms 647 pivoted on studs 648 projecting from the frames 506. During the first step of differential movement of the members 503 from normal position the arms 505 are not moved but when the members arrive at zero positions the lower ends of the racks 504 engage the transfer arms so that during the continued movement of the racks the transfer arms move with them. Upon movement of the pins 645 out of engagement with the ends 646 of the arms 647 the springs 644 rock the levers 639 to move the pins 640 into engagement with notches 649 in the members 503 for the purpose of latching the transfer arms and the members together. During return movement of the members 503 to normal position the pins 645 again engage the ends 646 if the arms 647 have not been moved out of normal position, thereby arresting the transfer arms 505 in zero position while the members 503 move one step past zero to normal position. When the pins 645 engage the edges 646 the levers 639 are rocked to unlatch the members 503 from the transfer arms.

Springs 650 tend to rock the arm 646 clockwise (Fig. 5) but such movement is normally prevented by engagement of pins 653 on the upper ends of corresponding levers 654 with shoulders 655 formed in slots 656 in the arms 647. Springs 657 normally retain the levers 654 in the latching position shown in Fig. 5. The levers 654 are pivoted on studs 658 projecting from the frames 506. The totalizer pinions 502 are provided with long teeth 659 which when the totalizer pinions pass from their nine positions to zero or beyond, engage projections 660 on the lever 654, thereby rocking the latter counter clockwise (Fig. 5) about their pivots 658. Such movement of a lever 654 carries its pin 653 out of engagement with the shoulder 655 on the arm 647 appropriate to the totalizer wheel of next higher order.

Upon disengagement of the pin 653 from the shoulder 655 the spring 650 rocks the arm 647 until movement of the latter is arrested by engagement of the lower end of its slots 656 with the pin 653. It can be seen that when the arm 647 is in moved position the pin 645 on the lever 639 carried by the corresponding transfer arm 505 does not engage the edge 646 during return movement of the member 503 and therefore the transfer arm moves with its rack 504 one step past zero position to effect the transfer.

The cam grooves 545 (Fig. 5) are constructed so that the differentially movable members 503 are first moved one step to zero position and then back to normal position before they are moved differentially under the control of the inserted destination devices. At the end of this one step of movement of the members 503 and before they are restored to normal position the tripped transfer devices are restored to normal position by the following described mechanism. The transfer devices are restored to normal position before the differential movement of the differentially movable members 503 is begun so that the actuating mechanism is moved to extents corresponding to the positions of the totalizer pinions during total and subtotal printing operations as will readily be understood from the description of the operation of the machine during total and subtotal printing operations.

A cross rod 664 (Figs. 4 and 5) is carried by the arm 125 and an arm 665 (Fig. 4) fast on the shaft 103. When the shaft 103 is rocked clockwise (Fig. 5) upon release of the machine as above described, the cross rod 664 moves into engagement with inclined edges 666 of the vertical arms of levers 668 when the levers are in moved position, but such movement of the rod 664 does not move the levers. Arms 670 of the levers 668 which are loose on the cross rod 500, engage ends 673 of the corresponding arms 647 so that when the arms 647 are rocked by the springs 650 the levers 668 are rocked counter clockwise (Fig. 5) to moved position. As above described the cam groove 126 (Fig. 3) for operating the pitman 120 is so constructed that while the differentially movable members 503 are in their zero positions and before they are returned to normal position preliminarily to their different movement the shaft 103 is rocked slightly clockwise (Fig. 5) and then moved back to the position to which it was moved upon release of the machine. During this additional clockwise movement of the shaft 103 the rod 664 rocks the levers 668 to move the arms 647 to normal position against the action of their springs 650 if the arms have been operated. When the operated arms 647 are restored to normal position the springs 657 operate the corresponding levers 654 to latch the arms in normal position. The cam grooves 545 (Fig. 5) for operating the driving bars 626 are so constructed that the differentially movable members are returned successively from lower to higher order to normal position for the purpose of effecting successive transfers as is well understood in the art.

*Total and subtotal printing.*

To print a subtotal the totalizer (Figs. 4 and 5) is moved into engagement with the teeth on the transfer arms 505 after the operated transfer mechanism has been restored and before the differentially movable members 503 are moved differentially from normal position and are retained in engagement with the teeth on the transfer arms and the racks 504 while the members 503 are moved differentially under the control of the totalizer pinions and then returned to normal position. In total printing operations the totalizer is moved into engagement with the teeth on the transfer arms at the same time as in subtotal printing operations but as the totalizer is to be left at zero it is disengaged from the actuating racks before the members 503 begin their return movement to normal position. The operation of the totalizer elements and their control over the differential mechanism in such operations will now be described and the mechanism for controlling the time of engagement of the totalizer with the actuating racks will be described later.

In total and subtotal printing operations movement of the members 503 is determined by the long teeth 659 (Figs. 4 and 5) on the totalizer pinions. These long teeth when the pinions arrive at zero engage arms 675 of levers 676 pivoted on pins 677 projecting from the frames 506. The levers 676 are connected by links 678 to the lower ends of links 679 which at their upper ends are pivoted on levers 680. The levers 680 are pivoted on studs 683 projecting from the frame 506. Loose on the pins 677 are levers 684 which at one end are provided with notches engaging over the pins connecting the pairs of links 678 and 679. The arms 684 are provided with teeth meshing with teeth 685 formed on disks 686 fast on a shaft 687 journaled at its left hand end in the left hand side frame of the machine and at its right hand end in a frame 688 (Fig. 40) fast on the right hand side frame of the machine. The shaft 687 is rocked counter clockwise (Fig. 5) in a manner to be described presently to rock the arms 684 clockwise and therefore move the arms 675 of the levers 676 into the path of movement of the long teeth 659 on the totalizer pinions. The lower ends of arms 690 are forked over pins 693 on the levers 680. The arms 690 are pivoted on pins 692 and fast to arms 694 carrying pins 695 adapted to coöperate with teeth 696 formed on extending portions 697 of segment gears 698 pivoted on the shaft 103. The segment gears 698 mesh with teeth 699 (Fig. 4) formed on the upper rear ends of the bars 530. It can be seen from this construction that when the totalizer pinion arrives at zero position its long tooth engages the corresponding arm 675, thereby rocking the arm 694 counter clockwise (Fig. 5) through the link 679, lever 680 and arm 690. When the arm 694 is rocked in this manner its pin 695 is moved into engagement with one of the teeth 696 on the segment 698 thereby arresting movement of the segment 698 and bar 530. When movement of the bar 530 is arrested in this manner the latch 523 is operated in the same manner as in adding operations to disconnect the bar 530 and rack 517 from the driving bar 526. In this manner the totalizer pinions control the extent of movement of the amount differential mechanism and adjust the sleeves 514 accordingly to position the type carriers 511. After the amount differential mechanism has been differentially positioned under the control of the totalizer pinions and before it begins its movement to normal position the shaft 687 (Fig. 5) is rocked clockwise to normal position thereby rocking the arms 694 to normal position to permit movement of the differential mechanism to normal position.

The means for effecting engagement of the totalizer with the actuating racks 504 during total and subtotal printing operations will now be described. Pitmen 700 and 703 (Figs. 7, 39 and 40) are mounted to slide on the cross rod 626 and shaft 77 in the same manner as the pitman 624 (Fig. 38). The pitman 700 (Fig. 7) carriers oppositely extending rollers 704 coöperating with corresponding cams 705, fast on the shaft 77. The pitman 703 (Fig. 39) carries oppositely extending rollers 706 coöperating with corresponding cams 707 also fast on the shaft 77. The cross rod 626 which projects through the slots 625 in the pitmen 624, 700 and 703 is mounted in a lever 708 and arm 709 fast on the shaft 508. Rigidly mounted on the shaft 508 is a control lever 710 (Figs. 1 and 40) which is adapted to be adjusted from normal to "total" or "subtotal" positions. When the lever 710 is in normal position the rod 619 (Fig. 38) projects between the projection 626 on the pitman 624, as above described, so that when the machine is operated to issue a ticket printed upon by the destination device the totalizer is actuated under the control of the amount holes in the destination device. When the lever is adjusted to its "total" position the cross rod 626 (Fig. 7) is swung rearwardly thereby moving all three pitmen 624, 700 and 703 to move a set-off 713 formed in a slot 714 in the pitman 700 over the cross rod 619. The cams 705 are so constructed that when the pitman 700 is in this position the totalizer is moved through the above described connections to engage it with the transfer arms before the members 503 are moved differentially out of normal position and to disengage it after the members have been differentially positioned so that the totalizer pinions are turned to zero and left in this position. When the lever 710 (Fig. 40) is adjusted to its "subtotal" position the cross rod 626 (Fig. 39) is moved forwardly to engage a set-off 716 in a slot 717 in the pitman 703 over the cross rod 619. The cams 707 are so constructed that when the pitman 703 is in this position the totalizer is moved into engagement with the totalizer arms at the same time as in total printing operations but is disengaged therefrom after the members 503 have been restored to normal position so that the amount on the totalizer is restored thereon.

It is understood, of course, that when one of the three pitmen 624, 700 and 703 is operated to effect engagement and disengagement of the totalizer with the actuating members the other two are operated idly, the three pitmen being operated upon each operation of the machine.

Fast on the shaft 687 carrying the disks 686 (Fig. 5) is an arm 720 (Fig. 7) carrying a pin 723 projecting into a slot 724 formed in a plate 725 mounted on the pitman 700. When the pitmen 624, 700 and 703 are in the position shown in Fig. 7, in which position the pitman 624 is effective, the vertical portion 726 of the slot 624 passes over the pin 723 and therefore movement of the pitman 700 does not operate the shaft 687. When the control lever 710 is moved to its "total" position the rearwardly extending portion 727 of the slot 724 engages over the pin 723 and when the control lever is moved to "subtotal" position the pin 723 is in the forward open end 728 of the slot 724. Therefore when the control lever is in "total" or "subtotal" positions operation of the pitman 700 rocks the shaft 687 to move the arms 675 (Figs. 4 and 5) into and out of the path of movement of the long teeth 659 of the totalizer pinions, as above described.

The lever 710 is alined in its various positions by the engagement of a roller 729 (Fig. 7) on a lever 731 in notches 732 formed in a plate 741 fast on the right hand side frame of the machine. The lever 731 is pivoted on the lever 708 and operated by a spring 746. For the purpose of locking the lever 710 against movement during operation of the machine and preventing operation of the machine when the lever 710 is not in one of its three positions of adjustment the following described device is employed. An arm 747 (Fig. 3) fast on the shaft 508 is provided with three slots 748. A roller 749 is mounted on a link 751 connecting an arm 752 fast on the shaft 103 with an arm 761 loose on the shaft 508. When the lever is in one of its positions of adjustment and the machine is released the roller 749 passes into one of the slots 748 and therefore locks the lever 710 against movement during operation of the machine. When the lever 710 is not in one of its positions of adjustment and the motor key 116 is pressed the roller 749 engages the forward edge of the arm 747 between two of the slots 748 thereby preventing release of the machine.

*Means for operating the yokes 583 and 587.*

In total and subtotal printing operations it is necessary to move the bails 583 and 589 (Figs. 3, 4 and 35) out of normal operative position to permit the differential mechanism to be controlled by the totalizer pinions. It is understood, of course, that during such operations no destination device is in the machine and therefore the bail 587 is not moved in the same manner as during operations in which the destination devices are employed to print on tickets.

The bail 583 is connected by a link 730 (Figs. 3 and 35) to a lever 733, pivoted on the shaft 687. The lever 733 is connected by a link 734 to an arm 735, fast on the shaft 508. Through these connections when the lever 710 is adjusted to its "total" or "subtotal" position the bail 583 is rocked counter clockwise (Fig. 3) to move its cross bar 580 from under the edges 585 on the bars 530 controlled by the totalizer pinions of higher order during total and subtotal printing operations. A pin 736 (Fig. 35) projects through a slot 737 formed in the bail 587 so that when the bail 580 is rocked, as above described, the pin 736 engages the rear end of the slot 737 to move the bail 587 out of normal position against the action of its spring 588. The slot 737 is so constructed that when the bail 587 is operated by a destination device, as above described, movement of the bail 580 out of normal position is not effected.

A pin 7351 which connects the link 734 to the arm 735 projects over an arm 7352 on the shaft 687 to prevent rocking of the shaft when the control lever 710 is in normal position.

*Means preventing preparation of the machine for total or subtotal printing when a destination device is in the machine.*

During total and subtotal printing operations the amount differential mechanism is controlled by the totalizer pinions, as above described and it is therefore necessary that a destination device should not be in the machine as the correct total or subtotal would not be printed. To this end the following described means is employed for preventing adjustment of the control lever 710 out of normal position when a destination device is in the machine.

An arm 740 (Figs. 4 and 22) is fast on a sleeve 742 which with a sleeve 753 is mounted on a shaft 743. An arm 744, also fast on the sleeve 742 is connected by a link 745 (Fig. 3) to the yoke 583. When the control lever 710 is adjusted to its "total" or "subtotal" position it is obvious that the arm 740 is rocked clockwise (Fig. 4). If a destination device is in the member 174 of the carrying frame 170 the yoke 583 and therefore the control lever cannot be adjusted as the arm 740 would engage the destination device and prevent such adjustment. If the control lever has been adjusted to its "total" or "subtotal" position when a destination device is not in the member 174 it can be seen that a destination device cannot pass into this member as the arm 740 projects into the chute 165 and therefore into the path of movement of the device.

In order to prevent unauthorized persons from operating the machine to print a total or subtotal the bolts of two locks 738 (Fig. 8) mounted on the cabinet of the machine are adapted to project over the arms of a lever 739 fast on the shaft 508 when the lever 710 is in its normal or adding position and the locks are in locking condition so that the lever 710 cannot be adjusted to its "total" or "subtotal" position.

*Means preventing printing of tickets of one class from destination devices of another class.*

As above stated destination devices are provided for printing on "one way" tickets and "round trip" tickets, the electro cylinder 413 (Figs. 3, 4 and 5) being adjusted to its "one way" or "round trip" printing position depending upon the class of destination device within the machine. It is obviously desirable to prevent the printing of a "round trip" ticket from a "one way" destination device and vice versa. To this end the following described means is employed for preventing the release of the machine when the lever 326 is in its "one way" position and a "round trip" destination device is in the machine, and vice versa.

One of two arms 750 (Figs. 4, 5 and 22) is fast on the sleeve 753 and the other fast on the shaft 743. Fast on the sleeve 753 and shaft 743 are arms 754 which at their rear ends are forked over pins 755 (Fig. 3) on corresponding levers 756, pivoted on the lower cross rod 519. Springs 757 (Figs. 1 and 3) interposed between the respective arms 754 and a pin 761 normally retain the levers 756, arms 754 and pawls 750 in the positions shown in the drawings. A lever 758 (Fig. 3) is pivoted at 759 on the slide 113. Pivoted on the cross rod 115 is a lever 760. Pivoted at 763 on the lever 760 is an arm 764 carrying a pin 765 which projects into a slot 766 formed in the lever 758. The downwardly extending arm of the lever 760 is provided with a recess through which a pin 768 on an arm 769 projects. The arm 769 is fast on the shaft 327 upon which the lever 326 (Fig. 7) is also fast. When the lever 326 is in its "round trip" position the pin 765 (as shown in Fig. 3) is in engagement with the forward end of a projection 773 on the upper end of the nearly vertical arm of the left hand lever 756. When the lever 326 is adjusted to its "one way" position the lever 760 is rocked clockwise (Fig. 3) whereupon the pin 765 is lowered into engagement with the forward vertical edge 772 of the right hand lever 756. When the motor key 116 is operated after a "one way" destination device has been inserted into the machine and the lever 326 has been adjusted to its "one way" position the pin 765 is moved rearwardly, thereby rocking the left hand arm 750 clockwise (Fig. 4) through the corresponding lever 756, arm 754 and the sleeve 753 or shaft 743. Upon such movement of this arm 750 its nose 775 moves into a groove 776 (Fig. 28) formed in the casing of the destination device. During movement of the slide 113 and motor key 116 the rear end of an arm 777 of the lever 758 passes over the forward end 758 of the slide 130. A spring 778 interposed between the lever 758 and a projection 779 on the slide 113 prevents the lever 758 from rocking clockwise (Fig. 3) about the pin 759, the spring 778 being stronger than the springs 757. When the motor key 116 is operated with a "round trip" destination device in the machine and the lever 326 in its "round trip" position the left hand lever 756 and the corresponding arm 750 (Fig. 22) are rocked to move the nose 775 on this latter arm into the groove 776 (Figs. 22 and 27) formed in the casing of the "round trip" destination device. During such operation of the motor key the arm 777 (Fig. 3) passes over the projection 778 on the slide 130. As the pin 765 engages but one of the levers 756 upon each operation of the motor key but one of the arms 750 is operated. If a "one way" destination device is in the machine and the lever 326 is in its "round trip" position or vice versa it can be seen that the groove 776 in the device is out of alinement with the nose 775 on the corresponding arm 750, the grooves 776 being in different positions on the two classes of destination devices. Thereby under such condition if the motor key 116 is depressed the lever 756 engaging the pin 765 cannot be rocked and therefore the lever 758 is rocked about the pin 759 and against the tension of its spring 778 during the initial movement of the motor key. In this manner the rear end of the arm 777 of the lever 758 is moved in front of the projection 778 on the slide 136 so that upon continued movement of the motor key and slide 113 the arm 777 engages the projection 778. As the end of the lower fork of the slide 130 engages the pin 108 at the same time the arm 777 engages the projection 778, it can be seen that the slide 113 cannot be moved to its rearmost position as it cannot be moved relative to the slide 130 and therefore its block 110 is not moved from under the stud 108. It is therefore obvious that the machine cannot be released under such conditions.

Detail slip printer.

As above described the amount type carriers 511 (Figs. 1 and 36) are fast on the sleeves 514 carrying the gears 513 which are adjusted by the amount differential mechanism and therefore movement of the latter is imparted to the type carriers.

A type carrier 785 (Fig. 1) for printing the initial of the ticket seller operating the machine is positioned by a handle 786 which is integral with the type carrier and projects through a slot in the cabinet of the machine to permit its adjustment. The type carrier 785 is alined in this adjusted position by engagement of the nose of an alining pawl 787 (Fig. 2) in notches 788 formed in the lever 786. The pawl 787 is operated by a spring 789.

A type carrier 790 (Figs. 1, 2 and 36) for printing characters during total and subtotal printing operations to designate whether the amount printed is a total or a subtotal is fast on the shaft 350. An arm 793 (Fig. 7) fast on the shaft 350 is connected by a link 794 to the cross rod 626 which, as above described, is mounted in the arm 709 and lever 708, fast on the shaft 508, adjusted by the control lever 710. Through these connections the type carrier 790 is adjusted by movement of the control lever 710.

Number type carriers 795 (Figs. 1 and 36) controlled by the number holes 160 in the destination devices for printing the numbers of the destination devices used are fast on the corresponding three innermost sleeves 514 (Fig. 7). Fast on these sleeves are gears 796, meshing with teeth 797 on corresponding racks 798 (Figs. 1 and 7). These racks 798 are like the racks 517 of the amount differential mechanism and are mounted on the cross rods 519 in the same manner. The racks 798 are connected to driving bars 799, which correspond to the driving bars 526 of the amount differential mechanism, by latches 800 which are identical to the latches 523 of the amount differential mechanism. Bars 803 which are mounted to the left of the racks 798 and correspond to the bars 530 of the amount differential mechanism are provided with recesses 804 through which rollers 805 on corresponding arms 806 project. The bars 803 are like the bars 530 (Fig. 4) of the amount differential units of higher orders except that the former are not provided with rack teeth or fingers. The arms 806 (Figs. 7 and 36) are fast on a corresponding shaft 807 and sleeves 808 mounted on the shaft. Arms 809 (Figs. 5, 33 and 36) fast on the shaft 807 and sleeves 808 carry rollers projecting into recesses 810 formed in sliding finger bars 811. The bars 811 are provided with slots 812 and 813 through which the sleeves 514 and the shaft 327 respectively project to guide the bars in their movements. Fingers 814 (Figs. 5, 33 and 34) on the lower ends of the bars 811 are in direct operative alinement with the number holes 160 (Fig. 25) in the destination device when the amount holes 159 are in direct operative alinement with the fingers 550.

From the above description it can be seen that the differential mechanism controlled by the number holes 160 is similar to the amount differential mechanism and is operated in the same manner. The racks 798 and bars 803 and 811 are moved with the driving bars 799 until the fingers 814 of the bars 811 engage the ends of the number holes whereupon the bars 803 and racks 798 are disengaged from the driving bars by operation of the latches 800. When the driving bars 799 are restored to normal position the bars 803 and racks 798 are connected thereto by the latches 800 in the same manner as the bars 530 and racks 517 of the amount differential mechanism are connected to the bars 526 upon return movement of the latter to normal position. Arms 821 (Fig. 7) of the number differential mechanism correspond to the arms 539 of the amount differential mechanism and are connected by cross rods 820 to the arm 697 for the amount differential unit of lowest denomination and are therefore moved to an invariable extent with this arm 697.

The type carriers 511, 785, 790 and 795 are employed to print on a detail strip 823 (Fig. 2) which is fed from a supply roll 824 about a platen 825 onto a storage roll 826. The platen 825 is mounted on an arm 827 which is pivoted on a lever 828 and adjusted relative thereto by a screw 829 so that printing impression of the desired distinctness may be made on the detail strip. The supply roll 824 and storage roll 826 are also mounted on the lever 828 which is pivoted at 830 on the left hand side frame of the machine. The lever 828 carries a roller (Fig. 37) projecting into a groove formed in the face of a disk 833, fast on the shaft 71. This cam groove is so constructed that while the type carriers are in their differentially moved positions the lever 828 (Fig. 2) is rocked counter clockwise so that the platen 825 carries the detail strip against the printing line of the type carriers to take a printing impression therefrom. Means for feeding the detail strip onto the supply roll 826 is not shown in the drawings as any desired form of feeding mechanism may be employed and such mechanism is not essential to the understanding of the invention.

An inking ribbon 835 (Fig. 2) through which the type carriers print upon the detail strip is fed from one of two spools 836 about five guide studs 837 onto the other spool 836. Any desired means may be employed for rotating the spools 826 to feed the ribbon from one spool onto the other.

While a printing impression is being taken the type carriers are alined in their adjusted positions by engagement of an alining bar 840 (Fig. 2) in notches 843 formed in the type carriers. The alining bar 840 forms the cross bar of a yoke 844 pivoted on a cross rod 845 supported in the left hand side frame of the machine and a bar 846 mounted on two of the guide studs 837. The yoke 844 carries a roller 848 projecting into a cam slot 849 formed in an arm 850 pivoted on one of the guide studs 837. The arm 850 is connected by a slot and pin connection 853 to a pitman 854 which at its lower end is forked over the shaft 71. The pitman 854 carries a roller projecting into a cam groove formed in the face of a disk 855, fast on the shaft 71. The cam groove in the disk 855 and the cam slot 849 in the arm 850 are so constructed that while the type carriers are in their differentially moved positions the yoke 844 is rocked to move its alining bar 840 into engagement with the notches 843 and thereby aline the type carriers.

*Recapitulation.*

It is thought that the above description is sufficient for a complete understanding of the invention. However, a résumé of its operation will be given here.

To operate the machine to issue a valid ticket the ticket seller inserts the proper destination device in the chute 165 (Figs. 1, 3 and 5) and operates the lever 190 (Fig. 7) to permit the inserted device to pass into the carrying frame 170 and permit the device employed at the last operation to move to the position shown in Fig. 6 so that it may be removed from the machine. Of course, if it is desired to print more than one ticket of the same class and the same destination the inserted destination device is permitted to remain in the machine until after the last ticket is issued.

The lever 326 (Figs. 7, 10 and 11) may be adjusted to its "one way" or "round trip" position either before or after the lever 190 is operated, if the lever 326 is not already in the desired position. Movement of the lever 326 through the shifting cam 328 and sleeve 833 shifts the lever 323 to move the roller 325 into the cam groove 320 or the roller 324 (Fig. 5) into the cam groove 318 dependent upon whether a "one way" or "round trip" ticket is to be issued. The electro cylinder 413 (Figs. 7 and 10) is shifted by the sleeve 833 through the arm 445 so that its "one way" or "round trip" printing plate will be in printing position in accordance to the position of the lever 326.

To release the machine the ticket seller pushes the motor key 116 rearwardly and during this movement the lug 110 (Fig. 3) on the slide 113 moves from under the pin 108 whereupon the spring 107 (Fig. 8) rocks the lever 104 and shaft 103 to effect the release of the machine, as fully described above.

Near the beginning of the operation of the machine the cross rod 184 (Figs. 5, 7 and 12) is moved rearwardly in the slots 189, as fully described above, to move the destination device to the position shown in Fig. 12. During this movement of the destination device the pin 4381 (Fig. 19) on the link 240 engages the arm 4371 to rock the pawl 4301 and thereby operate the consecutive numbering device of the inserted destination device. While the destination device is being moved to the position shown in Fig. 12 the platen carrying frames are moved to the positions shown in Fig. 12 and then the feeding mechanism shown in Figs. 3, 4 and 5 feeds the ticket into position over the platen 277 in the platen frame. During the feeding of the ticket the consecutive numbering device 418 (Fig. 5) the date wheels 428 and the positioned electro plate 443 print on the end of the ticket strip which is to form the ticket. After the end of the ticket strip has been fed over the platen 277 the ticket is severed therefrom by the severing mechanism and then the platen frame is rocked to normal position. The arms 305 (Figs. 3 and 10) are then rocked once or twice to raise the platen past normal position and thereby carry the ticket against the printing plate 155 and consecutive numbering device of the inserted destination device. If the roller 325 (Figs. 10 and 11) is in the cam groove 320 the arms 305 are rocked twice to print twice on a "round trip" ticket from the destination device and if the roller 324 (Figs. 5 and 11) is in the cam groove 318 the arms are rocked once so that a "one way" ticket is carried but once against the destination device.

While the destination device is in the position shown in Fig. 12 the amount and differential mechanisms are operated. When the fingers 550 on the bars 530 of the amount differential mechanism engage the bottoms of the amount holes 159, these bars, racks 517 and the associated parts are disconnected from the driving bars 526 by the operation of the latches 523. In like manner when the fingers 814 (Figs. 33 and 34) on the bars 811 engage the bottoms of the number holes 160 in the destination device the differentially movable parts of the number differential mechanism are disconnected from the driving bars 799 (Figs. 1 and 7), by operation of the latches 800. The differential movement of the racks 517 and 798 is imparted to the amount and number type carriers through the gears 513 and 569 on the corresponding sleeves 514. While the type carriers are in differentially moved positions the lever 828 (Fig. 2) is operated whereupon the platen 825 carries the detail strip 823 against the type carriers to print therefrom.

The differentially movable members 503 (Figs. 4 and 5) are moved differentially through the gears 513. While the members 503 are in the adjusted positions the totalizer pinions 502 are moved into engagement with the actuating racks 504 so that upon return movement of the members to normal position the totalizer is operated accordingly.

To print a total or a subtotal the control lever 710 is adjusted to its appropriate position. Then during the operation of the machine the totalizer is engaged with the teeth on the transfer arms 505 before the members 503 begin their differential movement so that the pinions are turned reversely to zero during movement of the members 503. As the totalizer pinions approach zero position the arms 694 are rocked under their control to arrest movement of segment gears 698 and bars 530. Then during a slight continued movement of the racks 517 the latches 523 are operated to disconnect the racks from the driving bars 526. If a total is to be printed the totalizer pinions are left in zero position but if a subtotal is printed the totalizer is maintained in engagement with the racks 504 and transfer teeth until the members 503 are restored to normal position so that the amount on the totalizer is restored thereon.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination with a main operating mechanism, of a plurality of destination devices separately movable into controlling position, an accounting mechanism, differential means under the control of the destination devices when the same are in controlling position for actuating the accounting mechanism during the operation of the machine, and means preventing operation of said differential means when no destination device is in controlling position.

2. In a machine of the class described, the combination with a main operating mechanism, of a plurality of normally detached destination devices separately insertible into the machine, an accounting mechanism, differential means moved under the control of the inserted destination device for actuating the accounting mechanism, and means preventing operation of said differential means when no destination device is in the machine.

3. In a machine of the class described, the combination with a main operating mechanism, of a plurality of destination devices, means for moving a destination device into position to print on a ticket, accounting mechanism, differential means controlled by the destination device in printing position for actuating the accounting mechanism, and means preventing operation of the differential means when a destination device is not moved to printing position, said means being disabled by a destination device when the latter is moved to controlling position.

4. In a machine of the class described, the combination with a main operating mechanism, of a plurality of normally detached destination devices separately insertible into the machine, an accounting mechanism, differential means moved under the control of the inserted destination device for actuating the accounting mechanism, and means preventing operation of said differential means when no destination device is in the machine and adapted to be disabled by the destination device inserted into the machine.

5. In a machine of the class described, the combination with a main operating mechanism, of a plurality of destination devices separately movable into controlling position, an accounting mechanism, differential means moved under the control of the destination device in controlling position for actuating the differential means, a yoke normally in the path of the differential means to prevent actuation thereof when a destination device is not in controlling position and adapted to be disabled by a destination device when the latter is moved into controlling position.

6. In a machine of the class described, the combination of an accounting mechanism, differential means for actuating the accounting mechanism, movable destination devices which when in position control the differential means, and means for preventing operation of the differential means when no destination device is in position.

7. In a machine of the class described, the combination of an accounting mechanism, differential means for actuating the accounting mechanism, movable destination devices which when in position directly control the differential means, and means for preventing operation of the differential means when no destination device is in position.

8. In a machine of the class described, the combination of an accounting mechanism, differential means for actuating the accounting mechanism, normally detached destination devices separately insertible into the machine and which when in position control the differential means, and means for preventing operation of the differential means when no destination device is in position.

9. In a machine of the class described, the combination of an accounting mechanism, differential means for actuating the accounting mechanism, normally displaced destination devices separately insertible into the machine and which when in position control the differential means, and means for preventing operation of the differential means when no destination device is in position.

10. In a machine of the class described, the combination of an accounting mechanism, differential means for actuating the accounting mechanism, a plurality of destination devices separately movable into position to control the differential means, and means for preventing operation of the differential means when no destination device is in position, and manipulative means for controlling the last mentioned means.

11. In a machine of the class described, the combination of an accounting mechanism, differential means for actuating the accounting mechanism, a plurality of destination devices separately movable into position to control the differential means, and means controlled by the destination devices for controlling the differential means.

12. In a machine of the class described, the combination of an accounting mechanism, differential means for actuating the accounting mechanism, a plurality of destination devices separately movable into position to control the differential means, and means for preventing operation of the differential means when no destination device is in position said means coacting with the destination device for releasing the last mentioned means.

13. In a machine of the class described, the combination of an accounting mechanism, differential means for actuating the accounting mechanism, a plurality of destination devices separately movable into position to control the differential means, a bar normally in position to prevent movement of the differential means, and a rod adapted to be moved by the destination device for displacing the bar so as to permit operation of the differential means.

14. In a machine of the class described, the combination of an accounting mechanism, differential means for actuating the accounting mechanism, destination devices separately movable into position to control the differential means, a bar for holding the differential means in fixed position, and a member adapted to be actuated by the destination device during the operation of the machine for shifting the bar so as to permit the differential means to actuate the accounting mechanism.

15. In a machine of the class described, the combination of an accounting mechanism, differential means for actuating the accounting mechanism, a plurality of destination devices separately movable into position to control the differential means, a supporting member mounted to oscillate and to coact with the differential means to hold the same in inoperative position, and a member adapted to be actuated by the destination device during the operation of the machine to oscillate the bar to permit the differential mechanism to function.

16. In a machine of the class described, the combination of an accounting mechanism, differential devices for actuating the accounting mechanism, a plurality of destination devices separately movable into position to control certain of the differential devices, two supporting means coacting with the differential devices to hold the same in inoperative position, means adapted to be actuated by the destination devices during the printing operation for shifting that supporting means which prevents operation of those differential devices which coact with the destination devices, and manipulating means for displacing both supporting devices when a total or sub-total is to be taken.

17. In a machine of the class described, the combination of an accounting mechanism, differential devices for actuating the accounting mechanism, a plurality of destination devices separately movable into position to control certain of the differential devices, two supporting means coacting with the differential devices to hold the same in inoperative position, a member adapted to be actuated by the destination devices during the printing operation for positively shifting that supporting means which prevents operation of those differential devices which coact with the destination devices, and manipulative means for removing both supporting devices when a total or sub-total is to be taken.

18. In a machine of the class described, the combination of an accounting mechanism, differential devices for actuating the accounting mechanism, a plurality of destination devices separately movable into position to control certain of the differential devices, two oscillating yokes coacting with the differential devices to hold the same in inoperative position, a member extending into the path of movement of the destination devices during the printing operation attached to and adapted to actuate that yoke which holds those differential devices which coact with the destination devices, and manipulative means for displacing both yokes when a total or sub-total is to be taken.

19. In a machine of the class described, the combination of an accounting mechanism, differential devices for actuating the accounting mechanism, a plurality of destination devices separately movable into position to control certain of the differential devices, two yokes relatively movable with respect to each other and normally supporting the differential devices in inoperative position, a bar attached to and adapted to actuate the yoke which holds those differential devices which coact with the destination devices which bar extends into the path of movement of the destination devices during the printing operation so that as the destination device moves into printing position the yoke is displaced and the differential devices permitted to coöperate therewith, a manipulative device for adjusting the machine for taking a total or sub-total, and another bar connecting the manipulative device and the second yoke for moving both yokes when a total or sub-total is to be taken.

20. In a machine of the class described, the combination with a plurality of destination devices separately movable into position to print on a ticket and provided with means representing the value of the tickets printed, of accounting mechanism, differential mechanism for actuating said accounting mechanism, driving mechanism for the differential mechanism, latches connecting the driving and differential mechanisms and constructed to be controlled by the value means of the destination device in printing position, and means controlling operation of said latches to prevent actuation of said accounting mechanism when no destination device is moved to printing position, said means being disabled when a destination device is moved to printing position.

21. In a machine of the class described, the combination with a plurality of destination devices separately movable into position to print on a ticket and provided with means representing the value of the tickets printed, of accounting mechanism, differential mechanism for actuating said accounting mechanism, driving mechanism for the differential mechanism to hold the same the driving and differential mechanisms and constructed to be controlled by the value means of the destination device in printing position, and locking mechanism for the differential mechanism to hold the same from movement when the driving mechanism is actuated, so that the differential mechanism is held fixed to prevent operation of the accounting mechanism when no destination device is in printing position, the locking means being disabled when a destination device is adjusted to printing position.

22. In a machine of the class described, the combination with a plurality of destination devices separately movable into position to print on a ticket, of a totalizer, differential mechanism for the totalizer controlled by the destination device moved to print on a ticket and adapted to be controlled by the totalizer, means for preventing actuation of said differential mechanism when a destination device is not in printing position and disabled by a destination device when moved to printing position, and means for rendering the differential mechanism effective to be controlled by the totalizer and adapted to disable said preventing means.

23. In a machine of the class described, the combination with a plurality of destination devices, separately movable into position to print on a ticket and provided with means representing the value of the tickets printed, a totalizer, differential mechanism for actuating said totalizer to add the value of the tickets issued and turn the totalizer to zero, driving mechanism for the differential mechanism, latches connecting the driving and differential mechanisms and constructed to be controlled by the destination devices when moved to printing position and by the totalizer when the latter is turned to zero, means controlling operation of said latches to prevent actuation of the differential mechanism when no destination device is moved to printing position and disabled when a destination device is moved to printing position, and means for disabling said preventing means when the totalizer is to be turned to zero.

24. In a machine of the class described, the combination with a main operating mechanism, of a plurality of normally detached destination devices separately insertible into the machine and adapted to print on tickets, a totalizer, differential means moved under the control of the inserted destination devices for actuating the totalizer and adapted to be controlled by the totalizer, and means preventing operation of said differential means during an operation in which no destination device is in the machine and adapted to be disabled when a destination device is in the machine and when the differential means is controlled by the totalizer.

25. In a machine of the class described, the combination with a plurality of destination devices separately movable into position to print on a ticket, of a totalizer comprising a plurality of totalizer wheels, differential units for the totalizer some of which are adapted to be controlled by the destination device moved into position to print on a ticket and all of which are adapted to be controlled by the totalizer wheels, means preventing actuation of the differential units controlled by the destination devices and adapted to be disabled when a destination device is moved into printing position, means preventing operation of the differential units which are not controlled by the destination devices, and means for disabling both of said preventing means when the differential units are controlled by the totalizer wheels.

26. In a machine of the class described, the combination with a main operating mechanism, of a plurality of normally detached destination devices separately insertible into the machine for printing on tickets, of a totalizer, actuating mechanism for the totalizer controlled by the destination devices, printing mechanism controlled by said actuating mechanism for printing the items entered on the totalizer and the totals thereof, a manipulative device for preparing the machine to print a total, and means for preventing operation of said manipulative device to prepare the machine to print a total when a destination device is in the machine and for preventing insertion of a destination device after the machine has been prepared to print a total.

27. In a machine of the class described, the combination with a plurality of destination devices, separately movable into position to be used to print on tickets, of a totalizer, differential mechanism for actuating the totalizer under the control of the destination devices and adapted to be controlled by the totalizer, printing mechanism for printing the items entered on the totalizer and the totals thereof, and means for preventing the printing of a total when a destination device is in position to be used to print on a ticket.

28. In a machine of the class described, the combination with a plurality of destination devices, separately movable into position to be used to print on tickets, of a totalizer, differential mechanism for actuating the totalizer under the control of the destination devices and adapted to be controlled by the totalizer, printing mechanism for printing the items entered on the totalizer and the totals thereof, and means for preventing the printing of a total when a destination device is in position to be used to print on a ticket, and for preventing movement of a destination device into position to be used when said preventing means is operated.

29. In a machine of the class described, the combination with a plurality of normally detached destination devices separately insertible into the machine for printing on tickets, of a totalizer, differential mechanism for actuating the totalizer under the control of the destination devices and adapted to be controlled by the totalizer, and means for preventing control of the differential mechanism by the totalizer when a destination device is in the machine.

30. In a machine of the class described, the combination with a plurality of normally displaced destination devices which may be separately positioned for printing on tickets, of a totalizer, differential means under the control of the destination devices for actuating the totalizer, means for setting the machine to take a total when no destination device is in position, and means coacting with the destination device to prevent the setting of the machine to take a total when the destination device is in position and to prevent the insertion of the destination device when the machine is in position to take a total or sub-total.

31. In a machine of the class described, the combination with a plurality of normally displaced destination devices which may be separately positioned for printing on tickets, of a totalizer, differential means under the control of the destination devices for actuating the totalizer, means for setting the machine to take a total when no destination device is in position, and a member connected to the total setting means and movable into the path of the destination device to prevent the setting of the machine to take a total when the destination device is in position and to prevent the insertion of the destination device when the machine is in position to take a total or sub-total.

32. In a machine of the class described, the combination with an accounting device, of differential mechanism for the accounting device, comprising two differentially movable members, driving means for moving the two members together, a device connecting said members to the driving means, determining means for arresting one of said members while the other member is constructed to have an additional movement to operate said connecting device, and means operated when said connecting device is operated to prevent rebound of said members.

33. In a machine of the class described, the combination with an accounting device, of differential mechanism for the accounting mechanism, comprising two differentially movable members, driving means for moving the two members together, a device connecting said members to the driving means, determining means for arresting one of said members while the other member is given an additional movement to operate said connecting device, a roller carried on the member given an additional movement, and a stationary element which together with the member given an additional movement coöperates with said roller to prevent rebound of the members.

34. In a machine of the class described, the combination with an accounting device, of differential mechanism for the accounting device, comprising a differentially movable member, driving means for said member, determining means for arresting said member, a roller mounted on said member, a spring for operating said roller, a stationary element, and means on said driving means normally preventing movement of said roller and adapted to permit movement of the roller when said member is arrested whereupon the spring operates the roller so that the latter coöperates with the member and the element to prevent rebound of the member.

35. In a machine of the class described, the combination with an accounting device, of differential mechanism for the accounting device comprising a differentially movable member having an inclined edge, driving means for said member, determining means for arresting said member, a roller mounted on said member, a spring for operating said roller, a stationary element having an edge inclined to the inclined edge on said member, and means on said driving means normally retaining the roller out of engagement with the inclined edge on said element and adapted to permit movement of the roller into engagement with said edge on the element when the member is arrested whereupon the roller coöperates with the inclined edges on the member and element to prevent rebound of the member.

36. In a machine of the class described, the combination with accounting mechanism, of differentially movable members for actuating same, an invariably moved main operating mechanism common to the differential members, latches operable to positively connect and disconnect the differential members and the operating mechanism, destination devices separately insertible into the machine and constructed to control the operation of said latches, and means effective when the operating mechanism is operated with no destination device inserted for operating the latches to disconnect the differential members from the operating mechanism before movement of the differential members begins.

37. In a machine of the class described, means for accumulating ticket fares, a "one way" and a "round trip" destination device for each of a number of destinations, said devices being separately insertible into the machine and constructed to control the accumulating means according to the "round trip" or "one way" fares, manipulative devices adjustable to either a "one way" or a "round trip" position, a normally effective machine lock and means for releasing same, and means for preventing release of the machine lock when the manipulative device is not set to accord with the inserted destination device.

38. In a machine of the class described, means for accumulating ticket fares, a "one way" and a "round trip" destination device for each of a number of destination stations, said devices being selectively insertible into the machine and constructed to control the accumulating means according to "round trip" or "one way" fares, manipulative devices operable to represent either a "one way" fare or a "round trip" fare, a normally effective lock and manipulative means for disabling said lock, and means preventing disabling of said lock when the manipulative devices are not operated to accord with the inserted destination device.

In testimony whereof I affix my signature.

HAAKON A. MARTIN.

Copies of this patent may be obtained for five cents each, by addressing the "Commissioner of Patents, Washington, D. C."